US008620537B2

(12) United States Patent
Kashiwagi

(10) Patent No.: US 8,620,537 B2
(45) Date of Patent: Dec. 31, 2013

(54) SHIFT-BY-WIRE SYSTEM

(75) Inventor: Tomoyuki Kashiwagi, Chita-gun (JP)

(73) Assignee: Denso Corporation, Kariya, Aichi-Pref. (JP)

( * ) Notice: Subject to any disclaimer, the term of this patent is extended or adjusted under 35 U.S.C. 154(b) by 1684 days.

(21) Appl. No.: 12/071,859

(22) Filed: Feb. 27, 2008

(65) Prior Publication Data

US 2008/0215215 A1 Sep. 4, 2008

(30) Foreign Application Priority Data

Mar. 1, 2007 (JP) ................ 2007-051735

(51) Int. Cl.
*F16H 61/00* (2006.01)

(52) U.S. Cl.
USPC .......................................... 701/51

(58) Field of Classification Search
USPC ............... 477/3, 70, 180; 318/701; 701/51
See application file for complete search history.

(56) References Cited

U.S. PATENT DOCUMENTS

| 6,623,404 | B2 | 9/2003 | Saito |
| 6,793,602 | B2 | 9/2004 | Kaigawa et al. |
| 6,992,451 | B2 | 1/2006 | Kamio et al. |
| 7,084,597 | B2 | 8/2006 | Nakai et al. |
| 7,221,116 | B2 | 5/2007 | Nakai et al. |
| 7,245,225 | B2 | 7/2007 | Kamio et al. |
| 7,257,476 | B2 | 8/2007 | Shimamura et al. |
| 7,572,203 | B2 | 8/2009 | Kashiwagi et al. |
| 2004/0139815 | A1 | 7/2004 | Shimamura et al. |
| 2005/0126321 | A1 | 6/2005 | Ochi et al. |
| 2005/0146302 | A1* | 7/2005 | Kamio et al. ........... 318/647 |
| 2005/0202928 | A1* | 9/2005 | Smith et al. ............... 477/3 |
| 2006/0142120 | A1 | 6/2006 | Amendt et al. ........... 477/180 |
| 2006/0197489 | A1* | 9/2006 | Nakai et al. ........... 318/701 |
| 2006/0276300 | A1 | 12/2006 | Kashiwagi et al. |
| 2007/0182353 | A1 | 8/2007 | Kamio et al. |

FOREIGN PATENT DOCUMENTS

| JP | 2002-89692 | 10/2003 |
| JP | 2003-314677 | 11/2003 |
| JP | 2004-282970 | 10/2004 |
| JP | 2004-346961 | 12/2004 |
| JP | 2005172148 A * | 6/2005 |
| JP | 2004-23890 | 8/2005 |

OTHER PUBLICATIONS

Japanese Office Action dated Jan. 6, 2009 issued in corresponding Japanese Application No. 2007-051735, with English translation.
Extended European Search Report dated Jun. 2, 2010, issued in corresponding European Application No. 08003285.7-2421.

* cited by examiner

*Primary Examiner* — Helal A Algahaim
*Assistant Examiner* — Rodney P King
(74) *Attorney, Agent, or Firm* — Nixon & Vanderhye PC

(57) ABSTRACT

A shift-by-wire system improves responsiveness to a shift command and ensures safety. An electric motor generates a rotational output to be used to switch the ranges of an automatic transmission. A by-wire control circuit unit electrically controls the rotation of the electric motor to comply with an inputted shift command. If a re-shift command is inputted during switching control, the by-wire control circuit unit modifies rotation control. The modification can be implemented until the rotational position of the electric motor reaches a new target rotational position to comply with the re-shift command.

22 Claims, 16 Drawing Sheets

P RANGE

R RANGE

N RANGE

D RANGE

SHIFT-BY-WIRE SYSTEM

CROSS REFERENCE TO RELATED APPLICATIONS

The present invention is based on and claims priority to Japanese Patent Application No. JP 2007-051735 filed on Mar. 1, 2007, the entire contents of which are incorporated herein by reference.

BACKGROUND OF THE INVENTION

1. Field of the Invention

The present invention relates to a shift-by-wire system and, more specifically, to a shift-by-wire system for shifting a drive condition of a vehicle transmission.

2. Description of the Related Art

In recent years, the tendency toward a transition from a mechanical driving system to an electrical driving system has grown in the field of vehicles such as automobiles in order to cope with a demand for space saving or improvement in assembling efficiency or controllability. As an example, development of a shift-by-wire system that uses an electric motor to electrically control range selection or switching, which can also be referred to as drive selection or switching, gear selection or switching, or the like, of an automatic transmission has been under way.

One shift-by-wire system that uses a by-wire control circuit unit to control the rotation of an electric motor to comply with a shift command inputted by a user and to thereby switch ranges has been disclosed in JP-A-2004-23890. Specifically, the system described in JP-A-2004-23890 designates a target rotational position so as to realize a target range to comply with the shift command, rotates the electric motor to the target rotational position, and thus achieves range switching. Moreover, when another shift command is inputted during switching control of ranges to comply with the shift command, the system in JP-A-2004-23890 designates a new target rotational position to comply with the re-shift command. Thus, the responsiveness to a shift command is improved.

In the system in JP-A-2004-23890, if a need arises for reversing the rotation of the electric motor due to a re-shift command inputted during a range switching control that is underway, the electric motor is rotated toward a new target rotational position only after the electric motor is suspended at the current actual rotational position. As a result, a range to be realized after the suspension of the rotation of the electric motor varies depending on the input timing of the re-shift command. However, difficulties may arise in that the realized range may cause the state of the automatic transmission to contradict an intended shift operation leading to a sense of discrepancy or discomposure to a user and creating a possibility of unintended shift operation-related consequences.

SUMMARY

The present exemplary embodiment addresses the foregoing and thus it is an object to provide a shift-by-wire system that improves responsiveness to a shift command and ensures safety.

According to various embodiments, a shift-by-wire system includes an electric motor that generates a rotational output for use in switching ranges of an automatic transmission in a vehicle and a by-wire control circuit unit that electrically controls the rotation of the electric motor to comply with a shift command inputted by a user. When a re-shift command is inputted during switching control in which the ranges are switched by controlling the rotation of the electric motor to comply with the shift command, the by-wire control circuit unit modifies rotation control until the rotational position of the electric motor reaches a new target rotational position to comply with the re-shift command. The above described operation is performed according to the actual rotational position of the electric motor attained at the time point of input of the re-shift command.

When a re-shift command is inputted during range switching control to comply with a shift command, rotation control may be modified based on the actual rotational position of the electric motor until the rotational position of the electric motor reaches a new target rotational position. Therefore, whatever the actual rotational position of the electric motor is at the time of input of the re-shift command, the electric motor can be rotated to the new target rotational position since the rotation control takes into account the actual rotational position. As a result, the automatic transmission will not be brought to a state contradictory to an intended shift position or operation and the responsiveness of the system to a shift command can be improved.

Hereinafter, the rotational region of the electric motor bringing the automatic transmission to a neutral state can be defined as a neutral region. According to other embodiments, in a case where a target rotational position attained when a re-shift command is input lies in a direction opposite to the actual rotational direction of the electric motor with respect to the actual rotational position of the electric motor and the actual rotational position lies in the neutral region, the by-wire control circuit unit controls the rotation of the electric motor so that the rotation will be null in the neutral region to which the actual rotational position belongs. Thereafter, the by-wire control circuit unit rotates the electric motor in the opposite direction so that the rotational position of the electric motor will reach the target rotational position.

Further in accordance with various embodiments, when the target rotational position lies in a direction opposite to the actual rotational direction with respect to the actual rotational position of the electric motor, the rotation of the electric motor is controlled to be null in the neutral region to which the actual rotational position belongs. The automatic transmission is thus brought to the neutral state. Therefore, the sense of discrepancy or discomposure that might be given to a user because the automatic transmission enters a non-neutral state contradictory to a user's intention can be suppressed.

It should further be noted that reference is made herein to a non-neutral region, which can be defined as the rotational region of the electric motor bringing the automatic transmission to the non-neutral state.

Still further in accordance with various exemplary embodiments, where the target rotational position lies in a direction opposite to the actual rotational direction of the electric motor with respect to the actual rotational position of the electric motor, the actual rotational position lies in the non-neutral region. When the neutral region lies in the actual rotational direction with respect to the actual rotational position, the by-wire control circuit unit continues the rotation in the actual rotational direction of the electric motor so that the rotational position of the electric motor will reach the neutral region in the actual rotational direction. The by-wire control circuit controls the rotation of the electric motor so that the rotation will be null in the neutral region. Thereafter, the by-wire control circuit unit rotates the electric motor in the opposite direction so that the rotational position of the electric motor will reach the target rotational position.

When the target rotational position lies in a direction opposite to the actual rotational direction and with respect to the actual rotational position of the electric motor, the rotation of the electric motor is controlled to be null in the neutral region, which is reached by the electric motor by continuing rotation in the actual rotational direction. Thus, the automatic transmission is brought to the neutral state. As a result, the sense of discrepancy or discomposure that would be given to a user because the automatic transmission enters the non-neutral state contradictory to the user's intension can be suppressed.

Still further in accordance with various exemplary embodiments, when at least one neutral region lies in the actual rotational direction of the electric motor with respect to the actual rotational position of the electric motor, the by-wire control circuit unit causes the rotational position of the electric motor to reach the neutral region closest to the actual rotational position in the actual rotational direction. Since the rotational position of the electric motor is caused to immediately reach the neutral region and the rotation thereof is nullified, the time during which the automatic transmission remains in the neutral state can be shortened as greatly as possible. Consequently, the sense of discrepancy that would be given to the user because the automatic transmission remains in the neutral state for a relatively long period of time can be avoided. Incidentally, it should be noted that when only one neutral region lies in the actual rotational direction with respect to the actual rotational position of the electric motor, that one neutral region is, for the purposes of the present disclosure, the neutral region closest to the actual rotational position as described above.

In a case where the target rotational position lies in a direction opposite to the actual rotational direction of the electric motor with respect to the actual rotational position of the electric motor and when the actual rotational position lies in the non-neutral region and when the neutral region does not lie in the actual rotational direction with respect to the actual rotational position, the by-wire control circuit unit controls the rotation of the electric motor so that the rotation will be null in the non-neutral region to which the actual rotational position belongs while implementing fail-safe control for ensuring vehicle safety. Thereafter, the by-wire control circuit unit rotates the electric motor in the opposite direction so that the rotational position of the electric motor will reach the target rotational position.

When the target rotational position lies in the direction opposite to the actual rotational direction with respect to the actual rotational position of the electric motor, while fail-safe control is implemented, the rotation of the electric motor is controlled to be null in the non-neutral region to which the actual rotational position belongs. Therefore, although the rotation of the electric motor is nullified in the region bringing the automatic transmission to the non-neutral state, the rotational position of the electric motor is allowed to reach the target rotational position before the rotation in the opposite direction from the actual rotational position, since vehicle safety is ensured owing to the fail-safe control, a sense of discomposure given to a user can be alleviated.

According to various embodiments, fail-safe control is such that an engine control means for controlling the output torque of a vehicle engine decreases the output torque. Consequently, even if the rotation of the electric motor is nullified in a region that brings the automatic transmission to a non-neutral state, a sense of discomposure can be alleviated and vehicle safety can be ensured due to the decrease in the output torque of the engine.

Fail-safe control can be further implemented in that a transmission control means, which controls the automatic transmission independently of the shift-by-wire system, fixes the automatic transmission in the neutral state. Consequently, even if the rotation of the electric motor is nullified in the region bringing the automatic transmission to the non-neutral state, a sense of discomposure can be alleviated and vehicle safety is ensured since the automatic transmission is fixed in the neutral state. In the above described scenarios, a warning unit can be included for giving warning during fail-safe control. However, since a user is informed of the fact that fail-safe control is under way, a sense of discrepancy derived from the fail-safe control itself can be alleviated.

It should be noted that in accordance with the above description, the "non-neutral region" can be characterized as the rotational region of the electric motor realizing a range of selections involving drive engagement of the automatic transmission. Moreover, the "neutral region" can be characterized as the rotational region of the electric motor realizing the neutral range of the automatic transmission or the parking range, or may be determined and located among multiple rotational regions of the electric motor realizing multiple ranges of the automatic transmission.

When the target rotational position lies in the actual rotational direction of the electric motor with respect to the actual rotational position of the electric motor, the by-wire control circuit unit continues the rotation in the actual rotational direction of the electric motor so that the rotational position of the electric motor will reach the target rotational position. Consequently, when the target rotational position lies in the actual rotational direction with respect to the actual rotational position of the electric motor, the rotation in the actual rotational direction can be continued as it is so that the rotational position of the electric motor will reach the target rotational position. Therefore, responsiveness can be improved but a sense of discrepancy or discomposure will not be given to a user.

When a re-shift command is inputted multiple times, the by-wire control circuit unit rejects any additional re-shift commands that exceed an upper limit, such as a predetermined limit on the number of times a re-shift command can be inputted within a certain amount of time. Consequently, heating and break down of the by-wire control circuit unit that electrically controls the electric motor resulting from response to an excessive number of shift commands within a certain period of time can be suppressed. In such a case or condition, a warning unit can give warning that a re-shift command is being rejected. Since a user is informed of the rejection of the shift command, a sense of discrepancy that might occur when the automatic transmission enters a state contradictory to the intended state due to the rejection of the shift command can be alleviated.

BRIEF DESCRIPTION OF THE DRAWINGS

Other objects, features and characteristics will be appreciated and become apparent to those of ordinary skill in the art and all of which form a part of the present application. In the drawings.

DESCRIPTION OF THE EXEMPLARY EMBODIMENTS

Multiple embodiments will be described below in conjunction with the drawings. It should be noted that in the following description, the acronym ECU stands for electronic control unit.

(First Embodiment)

Figure 2:
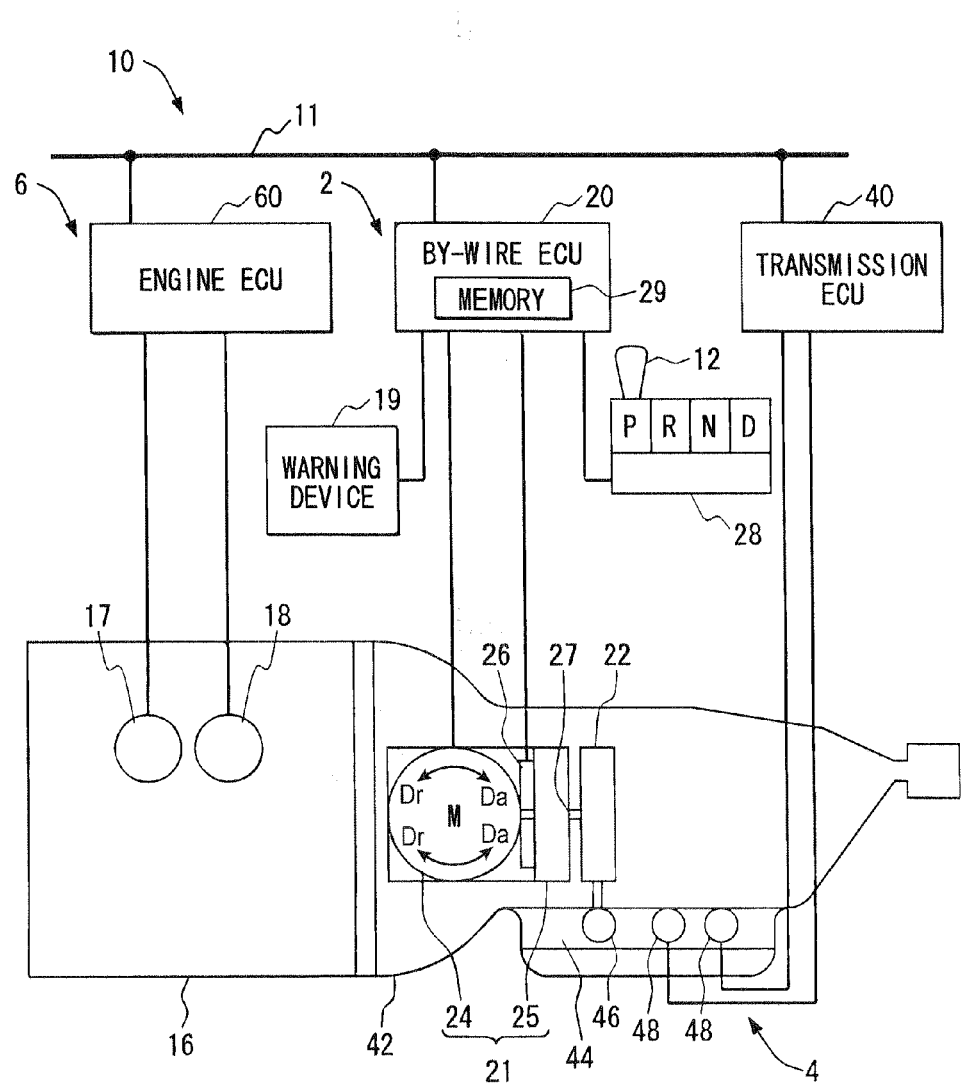
FIG. 2 is a block diagram illustrating a vehicle control system to which a shift-by-wire system in accordance with a first embodiment is adapted.

The vehicle control system 10 in accordance with a first embodiment, as shown in FIG. 2, is to be mounted in a vehicle and includes the shift-by-wire system 2, an automatic transmission control system 4, and an engine control system 6. The systems 2, 4, and 6 include dedicated ECU 20, ECU 40, and ECU 60 respectively, which are electric circuits each composed mainly of a microcomputer, and electrically or optically interconnected over an indoor LAN 11.

The automatic transmission control system 4 further includes a hydraulic circuit 44 that drives an automatic transmission 42. A manual valve 46 of the hydraulic circuit 44 includes a spool valve, and switches ranges of the automatic transmission 42 with an output oil pressure depending on a spool moving position. In the automatic transmission 42, a neutral (N) range and a parking (P) range are supported as ranges bringing the automatic transmission to a neutral state in which an output torque of an internal combustion engine 16 in a vehicle is not transmitted to the driving wheels of the vehicle. Moreover, in the automatic transmission 42, a reverse (R) range and a drive (D) range are supported as running ranges that bring the automatic transmission to a non-neutral state in which the output torque of the engine 16 is transmitted to the driving wheels of the vehicle.

Multiple electromagnetic valves 48 in the hydraulic circuit 44 fasten or release associated frictional elements (not shown) of the automatic transmission 42, whereby the shift stages of the transmission 42 are switched. Moreover, in the hydraulic circuit 44 in the present embodiment, a predetermined frictional element is released by the associated electromagnetic valve 48 irrespective of the spool moving position of the manual valve 46 in order to forcibly realize the N range. The transmission ECU 40 is electrically connected to the electromagnetic valves 48 and other multiple electrical elements constituting the hydraulic circuit 44, and electrically controls the actions of the electrical elements.

The shift-by-wire system 2 further includes an actuator 21 that drives the manual valve 46 of the automatic transmission control system 4, and a conversion mechanism 22. In the actuator 21, an electric motor 24 includes a switched reluctance motor that generates a rotational output when in the conducting or energized state. A deceleration mechanism 25 includes a gear mechanism that decelerates a rotational output of the motor 24, and transmits the rotational output to the conversion mechanism 22, which converts the rotational output into a linear motion. Accordingly, the spool moving position of the manual valve 46 is switched from one position to another. Consequently, in the present embodiment, the ranges of the automatic transmission 42 are switched based on the rotational position of the electric motor 24, which, hereinafter, is referred to simply as the motor rotational position.

The by-wire ECU 20 is electrically connected to each of the electric motor 24, a rotational position sensor 26, and a selector sensor 28. The rotational position sensor 26 includes, for example, a rotary encoder, and is disposed on the output side of the electric motor 24 in order to detect the motor rotational position. Moreover, the selector sensor 28 detects a user-requested range according to a manipulation performed on a range selector 12 of the vehicle, and outputs an analog signal or a digital signal representing the detected range. Consequently, the by-wire ECU 20 stores necessary information in a memory 29, and electrically controls the rotation of the electric motor 24 on the basis of the results of detections by the sensors 26 and 28 respectively. When the range detected by the selector sensor 28 changes from one to another, that is, when a range change is requested, the by-wire ECU 20 in the present embodiment decides that a shift command has been inputted. The by-wire ECU 20 implements rotation control in the electric motor 24 to switch the ranges so that the actual motor rotational position detected by the rotational position sensor 26 will be brought to a target rotational position, which is a rotational position of the motor associated with the changed requested range.

The by-wire ECU 20 is also electrically connected to a warning device 19 of the vehicle, and, if necessary, controls the warning device 19 so as to give a predetermined warning. Warning may be produced by displaying a warning lamp in, for example, the dashboard of the vehicle or by displaying a screen image on the monitor of the vehicle, by outputting a sound from a loudspeaker of the vehicle, or the like.

The engine ECU 60 of the engine control system 6 is electrically connected to a throttle device 17 and a fuel injection valve 18 which are included in the engine 16 of the vehicle. The throttle device 17 adjusts a throttle angle in an air intake passage in the engine 16. Moreover, the fuel injection valve 18 adjusts an injection quantity to be fed to an intake pipe or a cylinder in the engine 16. Consequently, when the engine ECU 60 electrically controls the throttle device 17 and fuel injection valve 18, the rotating speed and the output torque of the engine 16 are adjusted.

Figure 3:
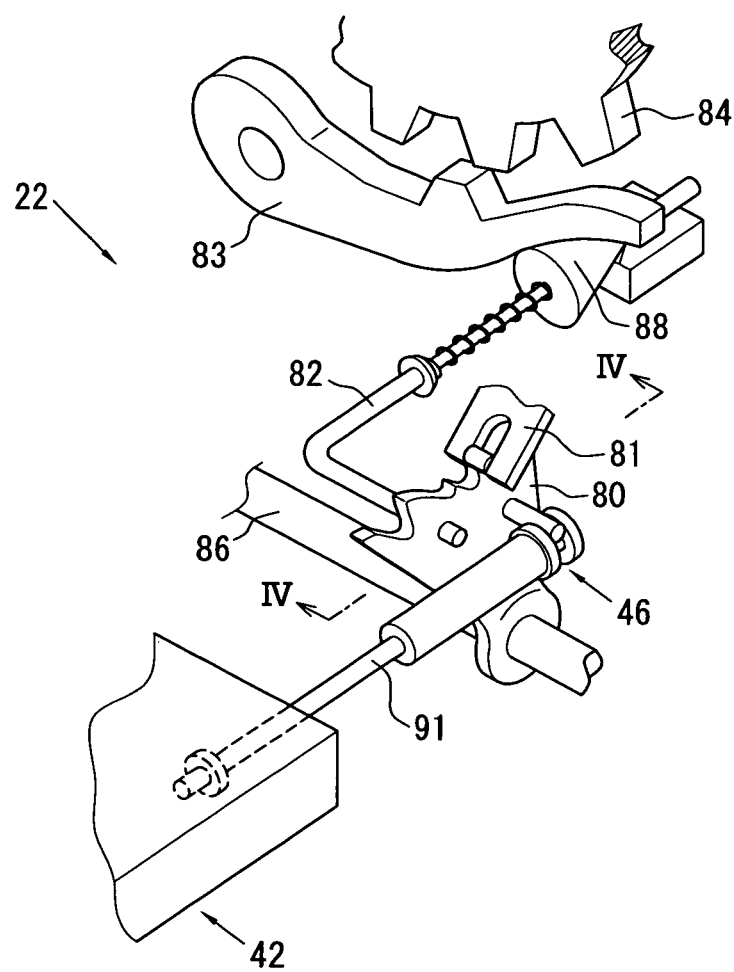
FIG. 3 is diagram illustrating a perspective view of the detailed construction of a conversion mechanism in accordance with a first embodiment.

As previously described, a rotational output of the motor 24, is converted into a linear motion by the conversion mechanism 22, which, as shown in FIG. 3, includes a detent plate 80, a detent spring 81, a park rod 82, a park pole 83, and a park gear 84. The drive shaft 86 of the detent plate 80 is disposed to be freely rotatable, and fixed to the output shaft 27 of the deceleration mechanism 25. A spool 91 of the manual valve 46 is linked to the detent plate 8Q. Consequently, in the present embodiment, when the detent plate 80 is rotated along with the rotation of the electric motor 24 linked to the detent plate 80 via the deceleration mechanism 25, the spool 91 moves in axial directions. Consequently, the ranges of the automatic transmission 42 are switched.

Figure 4:
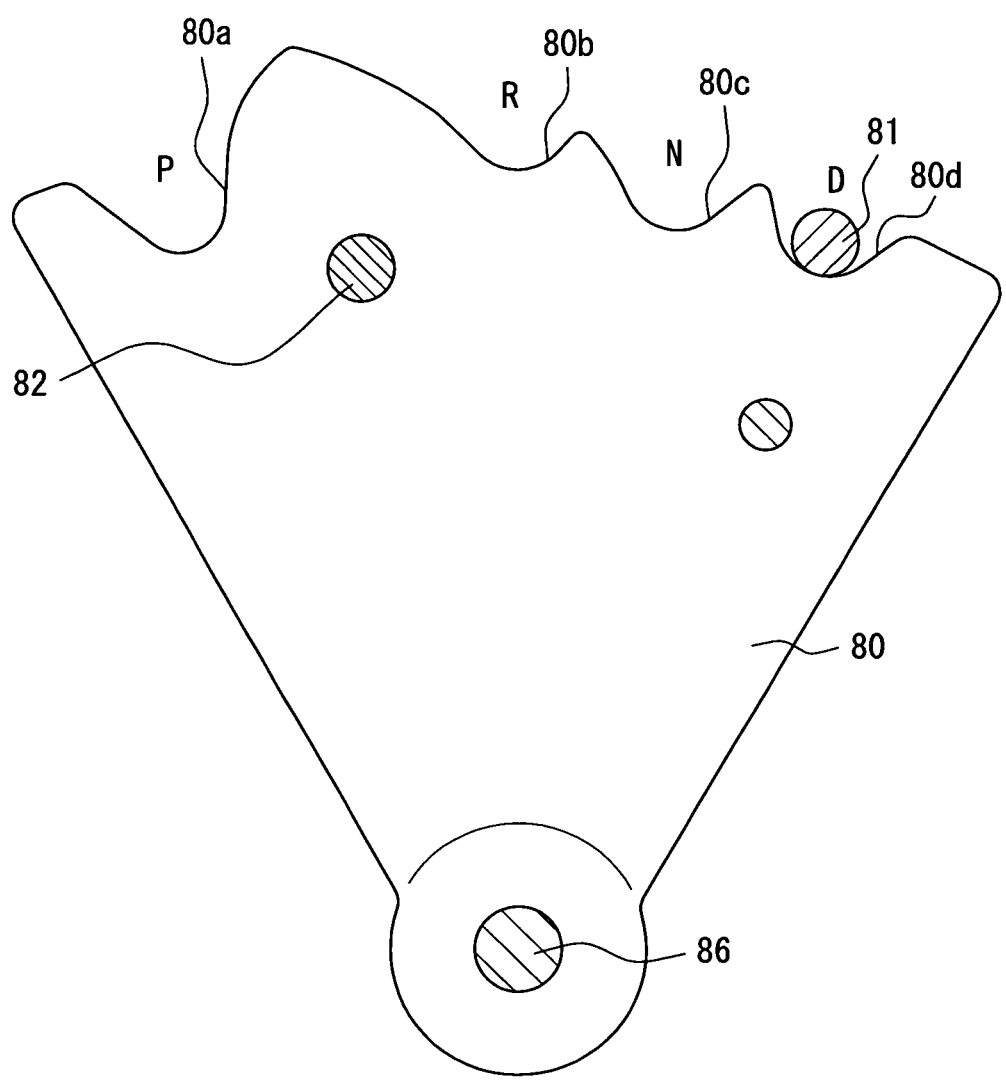
FIG. 4 is a diagram illustrating a cross-sectional view along the section IV-IV of the mechanism shown in FIG. 3.

As shown in FIG. 4, four indentations 80a, 80b, 80c, and 80d are formed in the outer circumferential periphery of the detent plate 80 in the rotation direction thereof. The indentations 80a, 80b, 80c, and 80d are associated with the ranges P, R, N, and D of the automatic transmission 42. The detent spring 81 is disposed to engage with any of the indentations 80a, 80b, 80c, and 80d according to the rotational position of the detent plate 80. Consequently, when the rotational position of the detent plate 80 allows the detent spring 81 to engage with the P indentation 80a, the P range is realized. Likewise, when the rotational positions of the detent plate 80 allow the detent spring 81 to engage with the R indentation 80b, N indentation 80c, and D indentation 80d respectively, the R range, N range, and D range are realized, respectively. When the P range is activated or deactivated, an additional locking or unlocking operation can occur.

For example, as also shown in FIG. 3, the park rod 82 is fixed to the detent plate 80. A conical member 88 attached to the park rod 82 abuts on the park pole 83. The park pole 83 is able to freely pivot and mesh with the park gear 84. The park gear 84 is fixed to the output shaft (not shown) of the automatic transmission 42. By the park pole 83 meshing with or receding from the park gear 84 according to the pivot position thereof, the park gear is locked or unlocked.

To be more specific, when the detent plate 80 rotates to a P-range realizable position, the park rod 82 moves to the park pole 83, and the conical member 88 causes the park pole 83 to mesh with the park gear 84. The gear 84 is thereby locked. Conversely, when the detent plate 80 rotates to an R-range realizable position beyond the P-range realizable position, the park rod 82 moves to a side opposite to the park pole 83. The conical member 88 causes the park pole 83 to recede from the park gear 84. The gear 84 is therefore unlocked.

Figure 5:
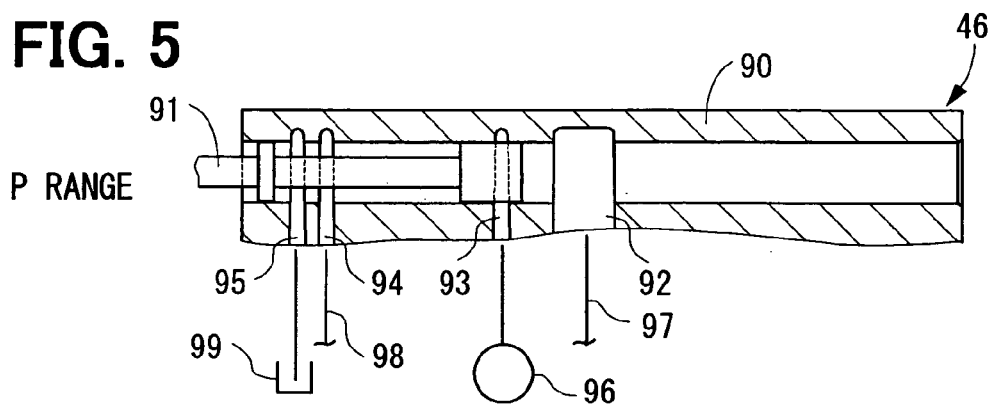
FIG. 5 is a diagram illustrating a sectional view of the detailed construction of a manual valve in accordance with a first embodiment, and a working state thereof.

As previously described, manual valve 46 switches ranges of the automatic transmission 42 with an output oil pressure depending on a spool moving position, and, as shown in FIG. 5, further includes a valve body 90 and a spool 91. In the peripheral wall of the valve body 90 having a cylindrical shape, a D-range pressure port 92, a line pressure port 93, an R-range pressure port 94, and a drain pressure port 95 are formed, in that order, from one end thereof to the other end thereof. The line pressure port 93 communicates with a line pressure generation source 96 such as a hydraulic pump that generates a line pressure. The D-range pressure port 92 communicates with an oil path 97 that can feed an oil pressure to the frictional elements which are fastened in the D range in the hydraulic circuit 44 of the automatic transmission 42. The R-range pressure port 94 communicates with an oil path 98 that can feed an oil pressure to the frictional elements which are fastened in the R range in the hydraulic circuit 44. The drain pressure port 95 communicates with an oil pan 99 serving as a drain that opens to the air. Incidentally, though not shown, in the present embodiment, the end of the valve body 90 near the D-range pressure port 92 also communicates with the oil pan 99.

The valve body 90 bears the spool 91 on the peripheral wall thereof so that the spool 91 can freely reciprocate in axial directions. The ports 92, 93, 94, and 95 are opened or closed depending on the moving position of the spool 91, whereby the ranges of the automatic transmission 42 are switched.

Specifically, when the spool 91 moves to the position shown in FIG. 5 or an area around the position, the line pressure port 93 does not communicate with the other ports 92, 94 and 95. Therefore, a line pressure is not fed to the oil paths 97 and 98 through the D-range and R-range pressure ports 92 and 94 respectively. In such a position, since the park gear 84 of the conversion mechanism 22 is locked, the P range is realized.

Figure 6:
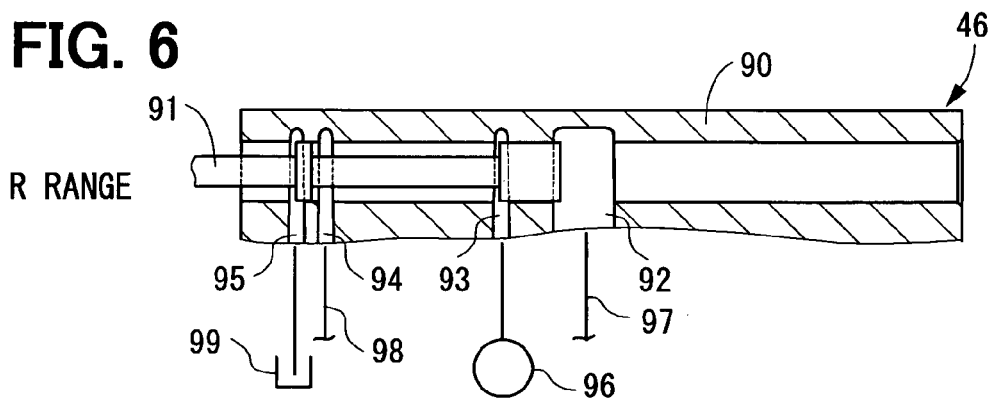
FIG. 6 is a diagram illustrating a sectional view of another working state of the manual valve shown in FIG. 5.

When the spool 91 moves to the position shown in FIG. 6 or an area around the position, a line pressure from line pressure generation source 96 is fed through the line pressure port 93, through the R-range pressure port 94, and to the oil path 98. Consequently, the R range is realized.

Figure 7:
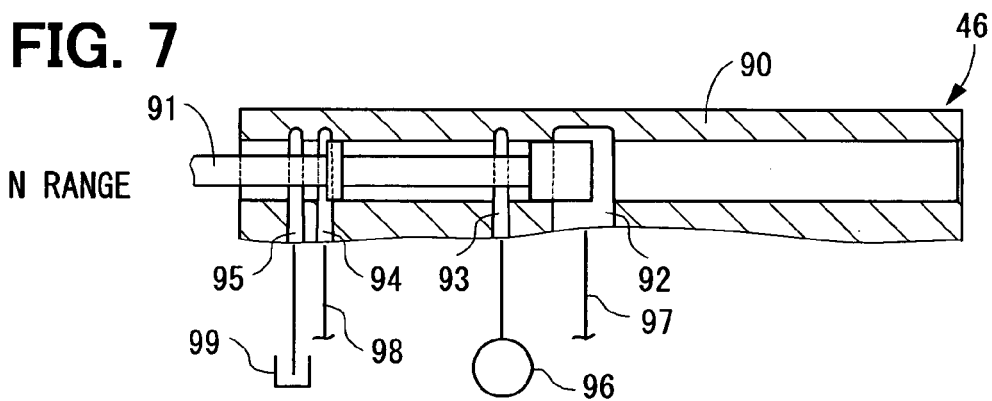
FIG. 7 is a diagram illustrating a sectional view of still another working state of the manual valve shown in FIG. 5.

When the spool 91 moves to the position shown in FIG. 7 or an area around the position, since the line pressure port 93 does not communicate with the other ports 92, 94, and 95, a line pressure is not fed to the oil paths 97 and 98 through the D-range and R-range pressure ports 92 and 94 respectively. In such a position, since the park gear 84 is unlocked, the N range is realized.

Figure 8:
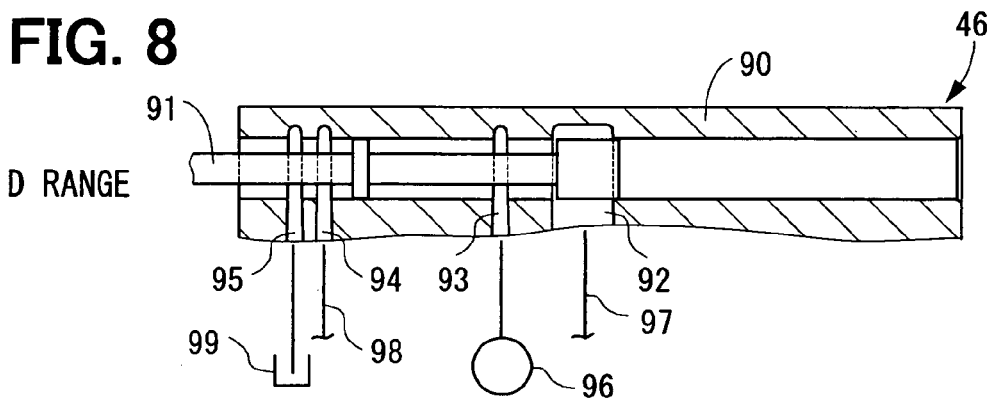
FIG. 8 is a diagram illustrating a sectional view of still another working state of the manual valve shown in FIG. 5.

When the spool 91 moves to the position shown in FIG. 8 or an area around the position, a line pressure from line pressure generation source 96 is fed through the line pressure port 93, through the D-range pressure port 92, and to the oil path 97. Consequently, the D range is realized.

Figure 9:
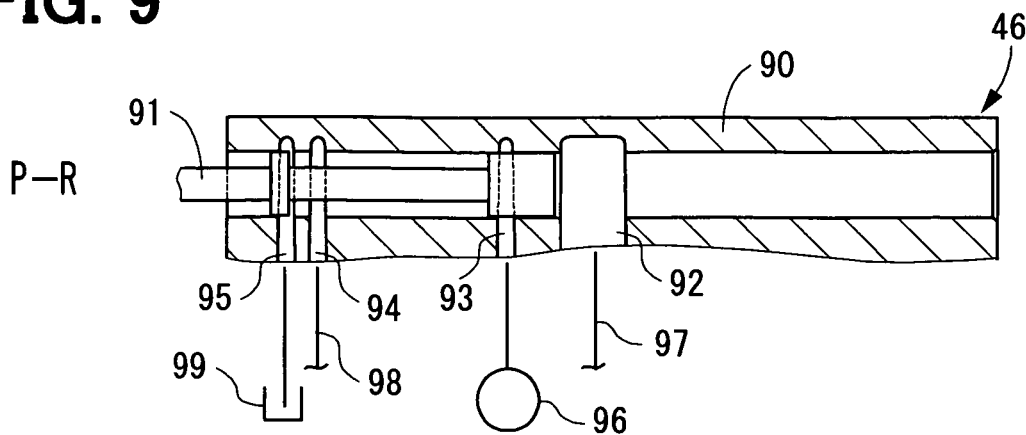
FIG. 9 is a is a diagram illustrating a sectional view of still another working state of the manual valve shown in FIG. 5.
Figure 10:
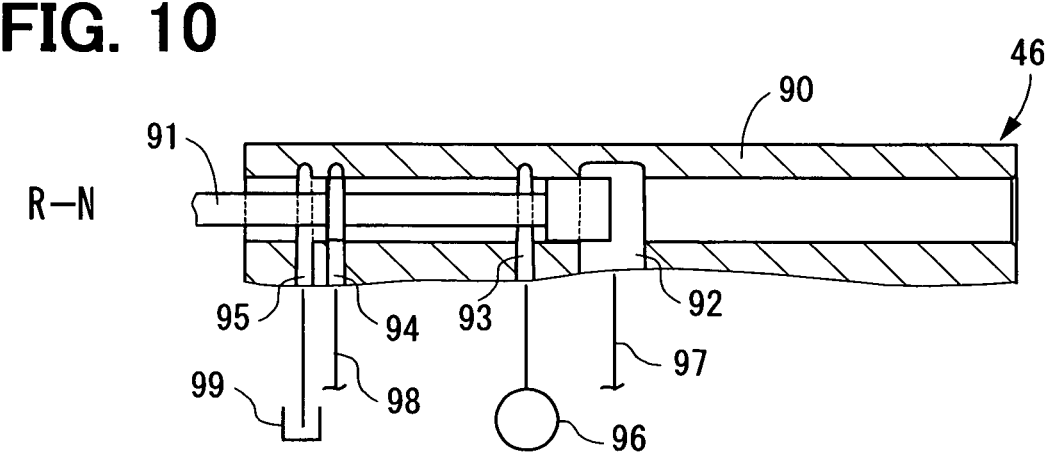
FIG. 10 is a is a diagram illustrating a sectional view of still another working state of the manual valve shown in FIG. 5.
Figure 11:
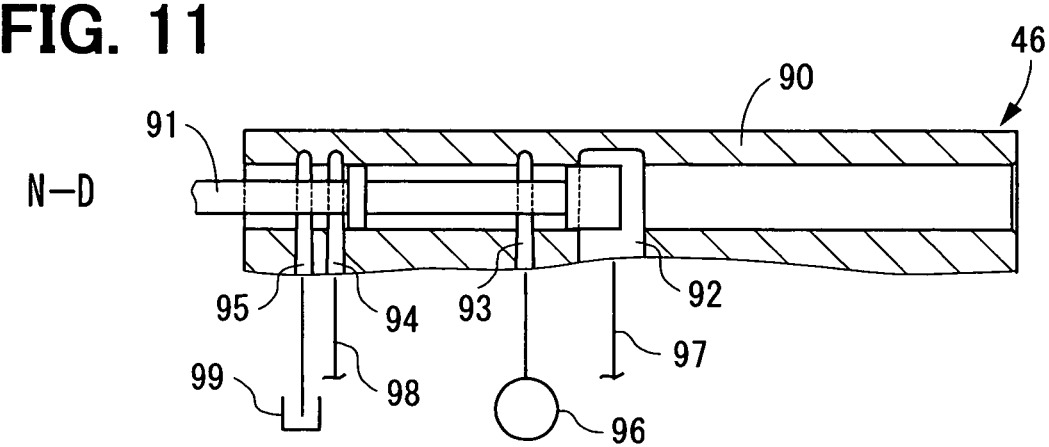
FIG. 11 is a is a diagram illustrating a sectional view of still another working state of the manual valve shown in FIG. 5.

As shown in FIG. 9 to FIG. 11, when the spool 91 moves to any of intermediate areas P-R, R-N, and N-D that are positioned among areas realizing the defined ranges, since the line pressure port 93 does not communicate with the other ports 92, 94, and 95, a line pressure is not fed to the oil paths 97 and 98 through the D-range and R-range pressure ports 92 and 94 respectively. In such intermediate positions, since the park gear 84 is unlocked, the automatic transmission 42 enters a state that is equivalent to the neutral state in which the N range is realized.

Next, a range control flow to be implemented by the by-wire ECU 20 will be described below with reference to FIG. 1 and FIG. 12. The range control flow is initiated with the ignition switch of the vehicle turned on, is repeated at intervals of a predetermined cycle, and is terminated with the ignition switch turned off.

Figure 1:
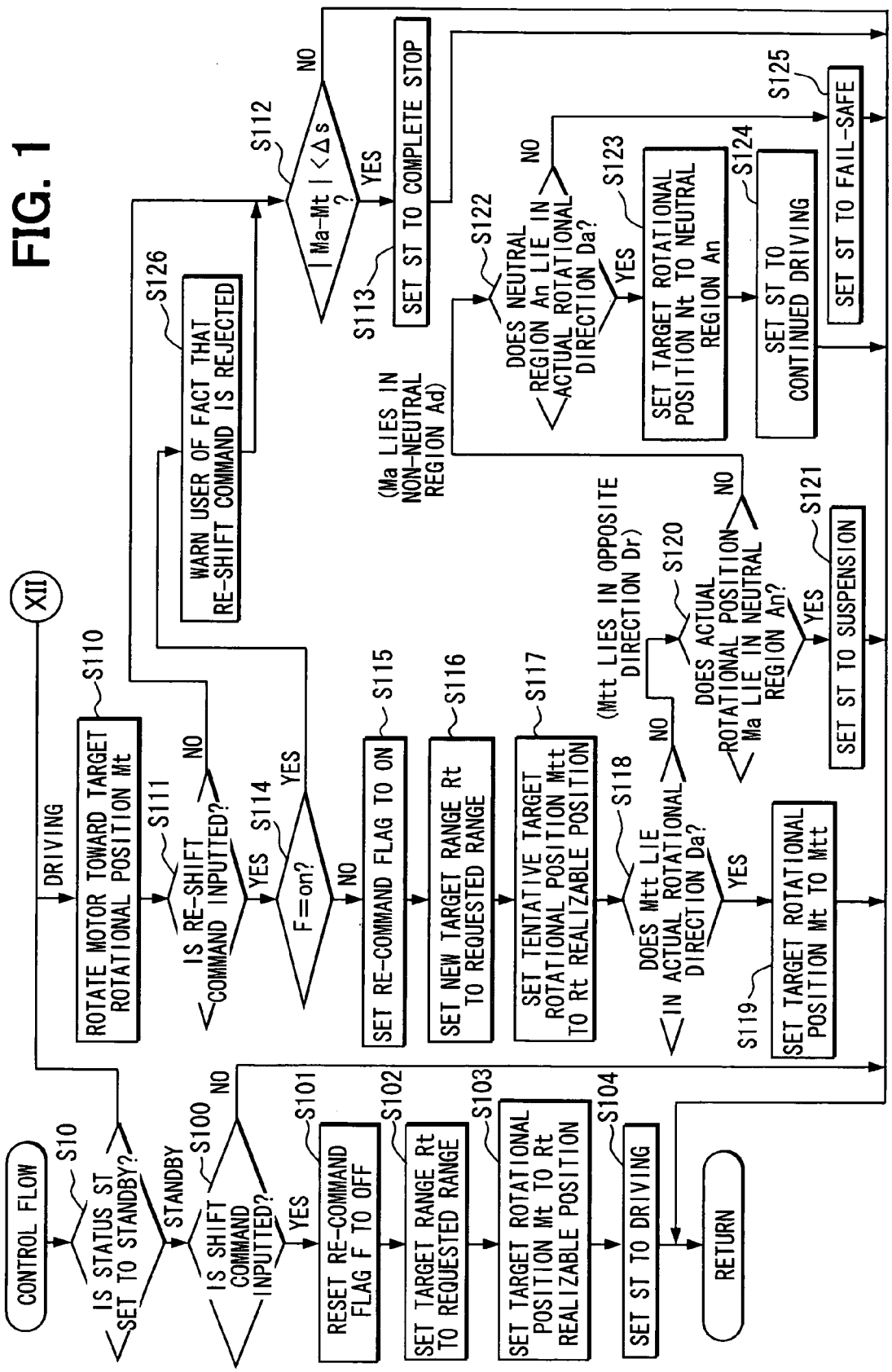
FIG. 1 is a flowchart illustrating an exemplary flow of range control in accordance with a first embodiment.

As described in FIG. 1, at S10 of the exemplary range control procedural flow, a current status (ST) is checked. The status ST falls into six states of Standby, Driving, Complete Stop, Suspension, Continued Driving, and Fail-safe.

(Standby Processing)

If the status ST is recognized as Standby at S10, processing proceeds to S100 of standby processing. At S100, a decision is made based on a range detected by the selector sensor 28 whether a shift command is inputted in a standby state.

If a shift command is inputted, corresponding to YES at S100, processing proceeds to S101, where a re-command flag F stored in the memory 29 is reset to off. At S102, a range a user has requested using the shift command, that is the range currently detected, for example, by the selector sensor 28, is designated as a target range Rt, and stored in the memory 29.

At S103, a motor rotational position realizing the target range Rt designated at S102 is designated as a target rotational position Mt, and stored in the memory 29. For example, if the D range is requested in a state in which the electric motor currently lies at the P-range position, the target range Rt is set to the D range. The target rotational position Mt is therefore set to, for example, 600° that is the motor rotational position equivalent to the D range. The set position is stored in the memory 29. Thereafter, at S104, the status ST is changed to Driving. Range switching control is initiated for rotating the electric motor 24 and processing returns to S10.

If a shift command is not inputted, corresponding to NO at S100, procedures S101 to S104 are skipped, and processing returns to S10. In the standby state, the electric motor 24 is stopped until a shift command is inputted, and the range of the automatic transmission 42 is maintained.

(Driving Processing)

If the status ST is recognized as Driving at S10, processing proceeds to S110 of driving processing where the electric motor 24 is rotated to the target rotational position Mt stored in the memory 29 from a previous period in the above described standby position or from an initialization procedure or the like as will be appreciated.

At S111, a decision is made based on a range currently detected by the selector sensor 28 whether a re-shift command, which is a shift command other than the previous shift command, has been presently inputted during range switching control.

If a re-shift command is not inputted during range switching control, corresponding to a NO at S111, processing proceeds to S112, where the actual rotational position Ma of the electric motor 24 currently detected by the rotational position sensor 26 is compared with the target rotational position Mt stored in the memory 29. A decision is made regarding whether a difference between the positions Ma and Mt falls below a reference value Δs.

It should be noted that the reference value Δs is set to a value smaller than the range of rotational regions of the electric motor 24 associated with the spool moving positions or areas around the positions, which are shown in FIG. 5 to FIG. 8 and at or in which the manual valve 46 realizes the ranges. Consequently, when the actual rotational position Ma associated with the current actual range Ra has approached the target rotational position Mt at a distance of the reference value Δs or smaller, the actual rotational position Ma has reached the target rotational position Mt with an error between them.

If the actual rotational position Ma has substantially reached the target rotational position Mt, corresponding to YES at S112, processing proceeds to S113, where the status ST is changed to Complete Stop, and processing returns to S10. If the actual rotational position Ma has not reached the target rotational position Mt, corresponding to NO at S112, S113 is skipped and processing returns to S10. Consequently, in such a position, the status ST is held in Driving and processing returns to S10, where subsequent processing is executed. The rotation of the electric motor 24 heading for the target rotational position Mt is continued.

It should be noted that the above-described processing is based on a NO determination at S111. If a re-shift command is inputted during range switching control, corresponding to YES at S111, processing proceeds to S114, where a decision is made regarding whether the re-command flag F stored in the memory 29 is set or "no." If the re-command flag F is not set, which can be referred to as reset, "off," or the like, corresponding to NO at S114, processing proceeds to S115, and the re-command flag F stored in the memory 29 is set.

Namely, in the present embodiment, if the re-shift command is inputted even once during range switching control, the re-command flag F will be set.

At S116, a range requested with the re-shift command, that is, a range currently detected by the selector sensor 28, is re-designated as a new target range Rt and stored in the memory 29 in place of any previously stored value. At S117, a motor rotational position realizing the new target range Rt designated at S116 is designated as a tentative target rotational position Mtt, that is, the tentative new position of the target rotational position Mt, and stored in the memory 29. Thereafter, at S118, a decision is made regarding whether the tentative target rotational position Mtt designated at S117 exists in the current actual rotational direction Da of the electric motor 24.

If the tentative target rotational position Mtt lies in the actual rotational direction Da, corresponding to YES at S118, processing proceeds to S119, where the target rotational position Mt stored in the memory 29 is updated with the tentative target rotational position Mtt and processing returns to S10. The status ST is held in Driving and processing returns to S10, where driving processing at S110 is executed. The rotation in the actual rotational direction Da of the electric motor 24 is continued toward the target rotational position Mt updated at S119.

If the tentative target rotational position Mtt exists in a direction Dr opposite to the actual rotational direction Da, corresponding to NO at S118, processing proceeds to S120, where a decision is made regarding whether the present actual rotational position Ma of the electric motor 24, as detected, for example, by the rotational position sensor 26, exists in a neutral region An. The neutral region An can refer to the rotational region of the electric motor 24 that brings the automatic transmission 42 to a neutral state as can occur in accordance with the spool 91 of the manual valve 46 moving to: the area realizing the N range as shown in FIG. 7; the area realizing the P range as shown in FIG. 5; and any of the intermediate areas P-R, R-N, and N-D spaced among the areas realizing the P, R, N, and D ranges as shown in FIG. 9 to FIG. 11.

If the current actual rotational position Ma lies in the neutral region An, corresponding to YES at S120, processing proceeds to S121. The status ST is changed to Suspension, and processing returns to S10. If the current actual rotational position Ma lies in a non-neutral region Ad, corresponding to NO at S120, processing proceeds to S122. A decision is made regarding whether at least one neutral region An exists in the current actual rotational direction Da. The non-neutral region Ad can refer to the rotational region of the electric motor 24 bringing the automatic transmission 42 to a non-neutral state by inducing the spool 91 of the manual valve 46 to move to: the area realizing the R range as shown in FIG. 6; the area realizing the D range as shown in FIG. 8; and the area realizing the D range as shown in FIG. 8.

If at least one neutral region An exists in the actual rotational direction Da, corresponding to YES at S122, processing proceeds to S123, where the target rotational position Mt is set in the neutral region An closest to the actual rotational position Ma in the current actual rotational direction Da. The target rotational position Mt stored in the memory 29 is updated. At S124, after the status ST is changed to Continued Driving, processing returns to S10. In contrast, if any neutral region An does not exist in the actual rotational direction Da, corresponding to NO at S122, processing proceeds to S125. The status ST is changed to Fail-safe, and processing returns to S10.

The above description is based on a NO at S114. If the re-command flag F stored in the memory 29 is set to on, corresponding to YES at S114, processing proceeds to S126. There, since the number of times a re-shift command is inputted during range switching control is two or more, a control signal is given to the warning device 19 in order to warn a user that the re-shift command should be rejected. Thereafter, when processing proceeds to S112, if the re-shift command is inputted for the second time or more, the target range Rt is not updated but a decision is made regarding whether range switching should be completed. Consequently, in the present embodiment, a limiting number of times of input of the re-shift command is set to one, and any re-shift command that inputted a second or greater time, which exceeds the limiting number of times, is rejected.

(Complete Stop Processing)

Figure 12:
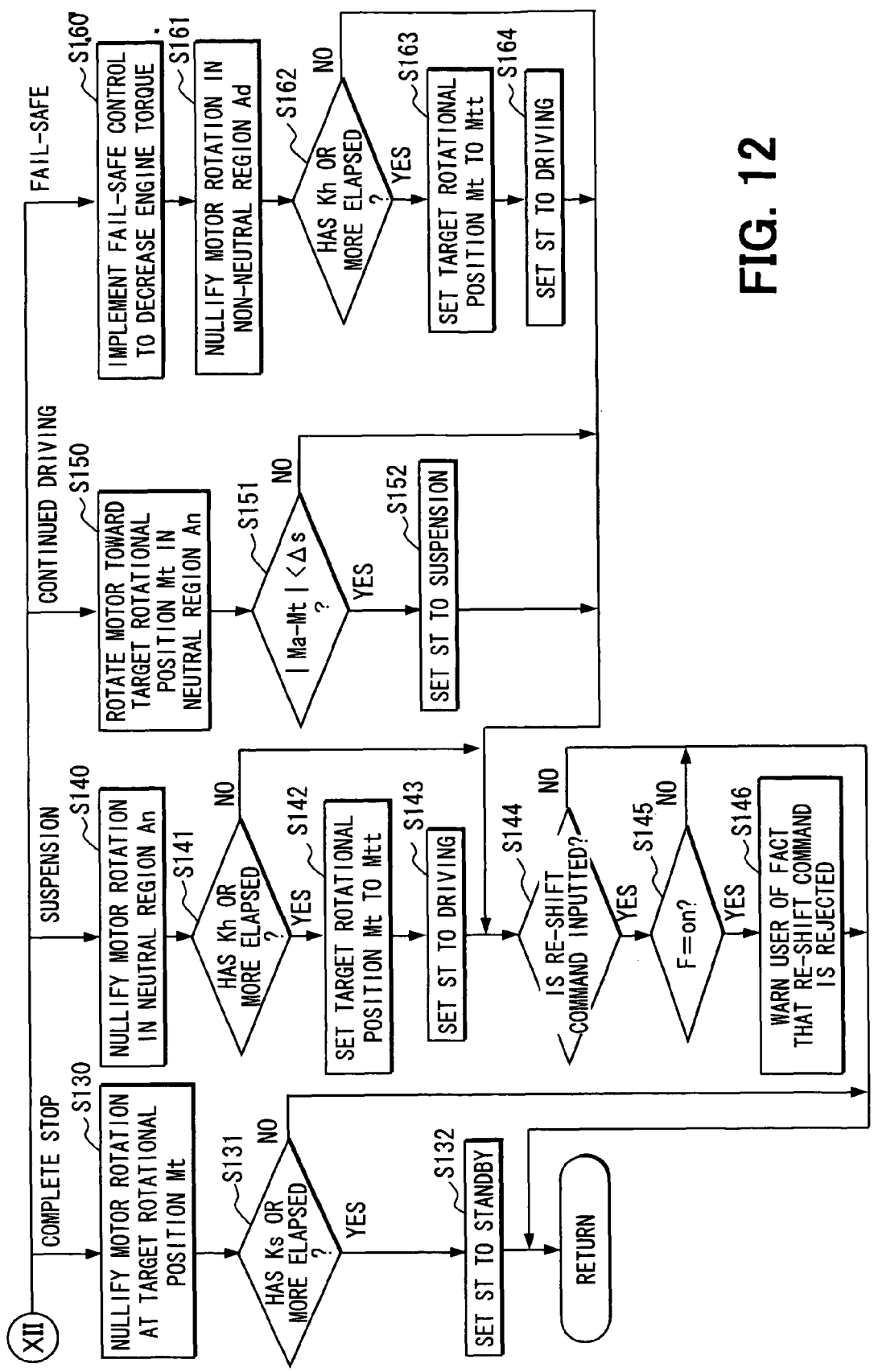
FIG. 12 is a is a flowchart illustrating an exemplary flow of range control in accordance with a first embodiment.

If the status ST is recognized as Complete Stop at S10, processing proceeds to S130 of complete stop processing as described in FIG. 12. At S130, the rotation of the electric motor 24 is controlled to be null at the target rotational position Mt, and the electric motor 24 is thus stopped.

At S131, a decision is made regarding whether a designated time Ks or a greater amount of time has elapsed since the electric motor 24 was stopped at S130, which is immediately after the status ST is changed to Complete Stop nearest to S113 of driving processing, such as, for example, occurring in the immediately preceding control routine. It will be understood that reference hereinafter to "nearest to" a given routine will also refer to processing in the immediately preceding routine.

If a designated time Ks or a greater amount of time has elapsed since the electric motor 24 was stopped, corresponding to YES at S131, the electric motor 24 is considered to be completely stopped and processing then proceeds to S132. At S132, the status ST is changed to Standby, and range switching control is terminated. Processing then returns to S10. If a designated time Ks or a greater amount of time has not elapsed since the electric motor 24 was stopped, corresponding to NO at S131, S132 is skipped and processing returns to S10. Consequently, range switching control is continued until the electric motor 24 is completely stopped.

(Suspension Processing)

If the status ST is recognized as Suspension at S10, processing proceeds to S140 of suspension processing. At S140, the rotation of the electric motor 24 is controlled to be null in the neutral region An in order to stop the motor 24. Consequently, vehicle safety is ensured.

At S141, a decision is made regarding whether a designated time Kh or a greater amount of time has elapsed since the electric motor 24 was stopped at S140, which is immediately after the status ST is changed to Suspension nearest to S121 of driving processing or nearest to S152 of continued driving processing, which will be described greater detail hereinafter.

If a designated time Kh or a greater amount of time has elapsed since the electric motor 24 was stopped, corresponding to YES at S141, the reversion of the electric motor 24, which is a switched reluctance motor, is considered to be enabled, and processing proceeds to S142. At S142, the target rotational position Mt stored in the memory 29 is updated with the tentative target rotational position Mtt stored in the memory 29, that is, the tentative target rotational position Mtt designated at the nearest S117 of driving processing. At S143, the status ST is changed to Driving.

Thereafter, if it is confirmed that a re-shift command has been executed, corresponding to YES at S144 and flag F is set, corresponding to YES at S145, warning that a re-shift command is rejected is given at S146, and processing returns to S10. In contrast, if a re-shift command has not been executed, or if the flag F is not set, corresponding to NO at any one of S144 and S145, S146 is skipped and processing returns to S10.

As mentioned above, after the electric motor 24 is suspended for the designated time Kh, processing returns to S10, and S110 of driving processing is executed. Consequently, the electric motor 24 is rotated toward the target rotational position Mt updated at S142.

If a designated time Kh or a greater amount of time has not elapsed since the electric motor 24 was stopped, corresponding to NO at S141, steps S142 and S143 are skipped and processing returns to S10 through steps S144 to S146.

(Continued Driving Processing)

If the status ST is recognized as Continued Driving at S10, processing proceeds to S150 of continued driving processing. At S150, the rotation in the actual rotational direction Da of the electric motor 24 is continued toward the target rotational position Mt stored in the memory 29, that is, the target rotational position Mt designated in the neutral region An at the nearest S123 of driving processing.

If a difference between the current actual rotational position Ma and the target rotational position Mt in the neutral region An falls below the reference value $\Delta s$, corresponding to YES at S151, the actual rotational position Ma is considered to have substantially reached the target rotational position Mt in the neutral region An, and processing proceeds to S152. The status ST is then changed to Suspension. Thereafter, processing returns to S10 through steps S144 to S146 in the same manner as that during suspension processing. After the electric motor 24 is rotated from the non-neutral region Ad to the neutral region An, processing returns to S10, and S140 of suspension processing is executed. Consequently, the electric motor 24 is stopped in the neutral region An, and vehicle safety is ensured.

If a difference between the current actual rotational position Ma and the target rotational position Mt in the neutral region An does not fall below the reference value $\Delta s$, corresponding to NO at S151, the current actual rotational position Ma is considered to still lie in the non-neutral region Ad, and S152 is skipped. Thereafter, processing returns to S10 through steps S144 to S146 in the same manner as that during suspension processing.

(Fail-Safe Processing)

If the status ST is recognized as Fail-safe at S10, processing proceeds to S160 where fail-safe control is implemented through fail-safe processing. Specifically, in the present embodiment, a control signal causing at least one of the throttle angle of the throttle device 17 and the injection quantity of the fuel injection valve 18 to be decreased is given to the engine ECU 60, whereby an engine torque is decreased until the engine speed equals an idle speed, or the like.

In the present embodiment, once fail-safe control is initiated at S160, which can occur immediately after the status ST is changed to Fail-safe during the nearest procedure S125 of driving processing, the fail-safe control is continued until the rotation of the electric motor 24 is initiated at S110 of driving processing as described in greater detail hereinafter. In the present embodiment, when the fail-safe control is continued, a control signal is given to the warning device 19 and a user is warned of the continuation of fail-safe control.

At 161, the rotation of the electric motor 24 is controlled to be null in the non-neutral region Ad in order to stop the motor 24. In such as position, since fail-safe control initiated at S160 is continued, even if the automatic transmission 42 enters the non-neutral state because the electric motor 24 is stopped in the non-neutral region Ad, vehicle safety is ensured.

At S162, after vehicle safety is ensured in the manner mentioned above, if the designated time Kh or a greater amount of time has elapsed since the electric motor 24 is stopped at S161 immediately after the status ST is changed to Fail-safe at the nearest S125 of driving processing, corresponding to YES at S162, the reversion of the electric motor 24 is considered to be enabled, and processing proceeds to S163. The target rotational position Mt currently stored in the memory 29 is updated with the tentative target rotational position Mtt, which is also stored in the memory 29. That is, the tentative target rotational position Mtt designated at the nearest S117 of driving processing is determined to be the target position. At S164, the status ST is changed to Driving. Thereafter, processing returns to S10 through steps S144 to S146 as previously described. After the electric motor 24 is suspended for the designated time Kh, processing returns to S10, and S110 of driving processing is executed. Consequently, the electric motor 24 is rotated toward the target rotational position Mt updated at S163.

If the designated time Kh or a greater amount of time has not elapsed since the electric motor 24 is stopped, corresponding to NO at S162, steps S163 and S164 are skipped. Thereafter, processing returns to S10 through steps S144 to S146.

(Normal Operation)

Figure 13:
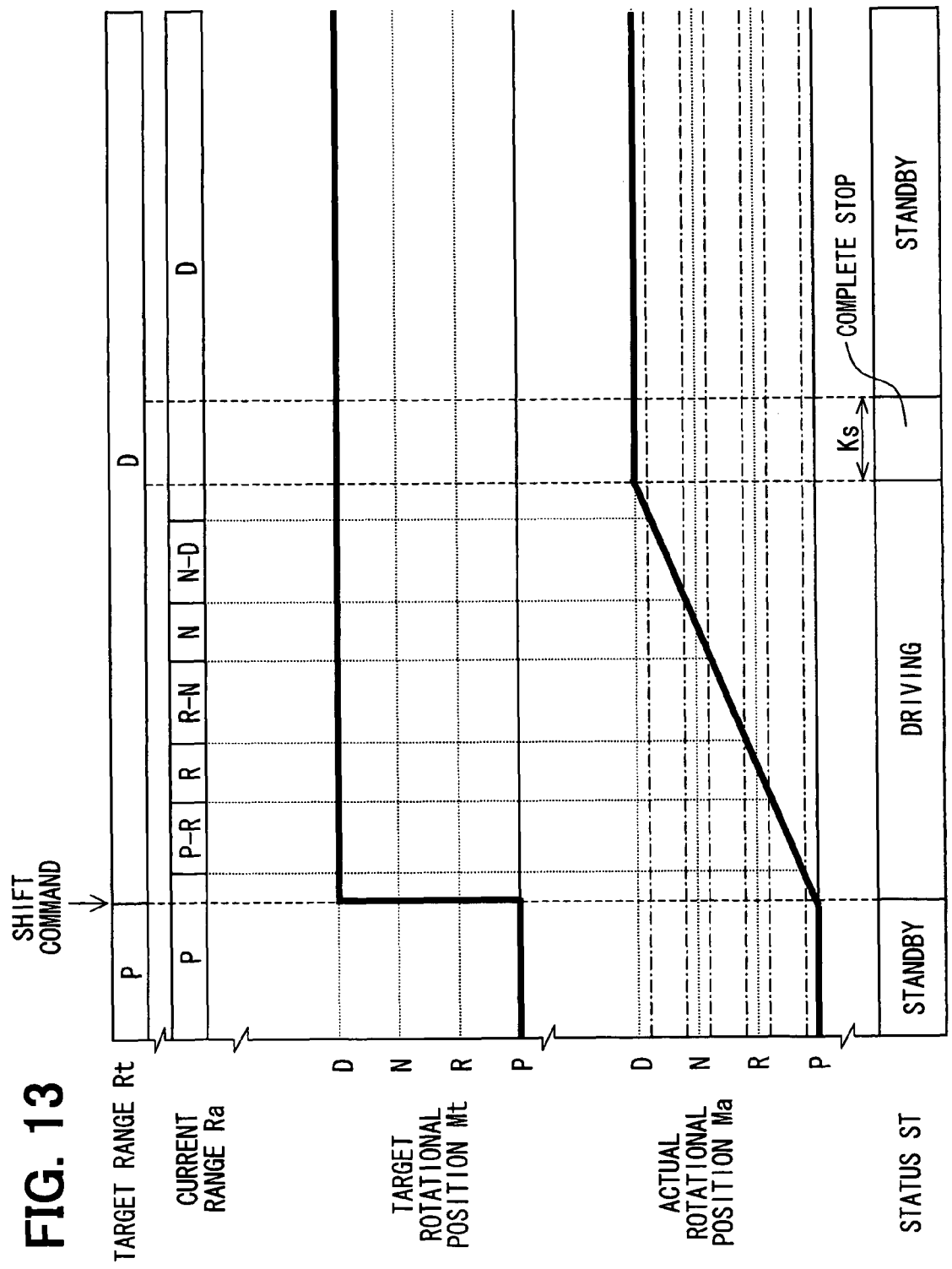
FIG. 13 is a diagram illustrating an exemplary normal operation of the shift-by-wire system in accordance with a first embodiment.

Characteristic operations of the shift-by-wire system 2, as shown for example, in FIG. 13, realized according to the foregoing range control flow, will now be described with reference to an example of normal operation performed in a case where a re-shift command is not inputted during range switching control initiated with input of a shift command. In the example shown in FIG. 13, switching from the P range to the D range can be requested with the shift command.

First, if a shift command is inputted with the status ST set to Standby, the target range Rt is set to the D range, and the target rotational position Mt of the electric motor 24 is set to a D-range realizable position. Thereafter, the status ST is changed to Driving, and the electric motor 24 is rotated toward the target rotational position Mt.

When the actual rotational position Ma of the electric motor 24 reaches the target rotational position Mt, the status ST is changed to Complete Stop, and the electric motor 24 is stopped. After the designated time Ks elapses, when the status ST is changed to Standby, range switching control is terminated.

(Re-Commanded Operation)

FIG. 14 through FIG. 18 show first through fifth exemplary re-commanded operations to be performed in a case where a re-shift command is inputted during range switching control initiated with input of a shift command.

Figure 14:
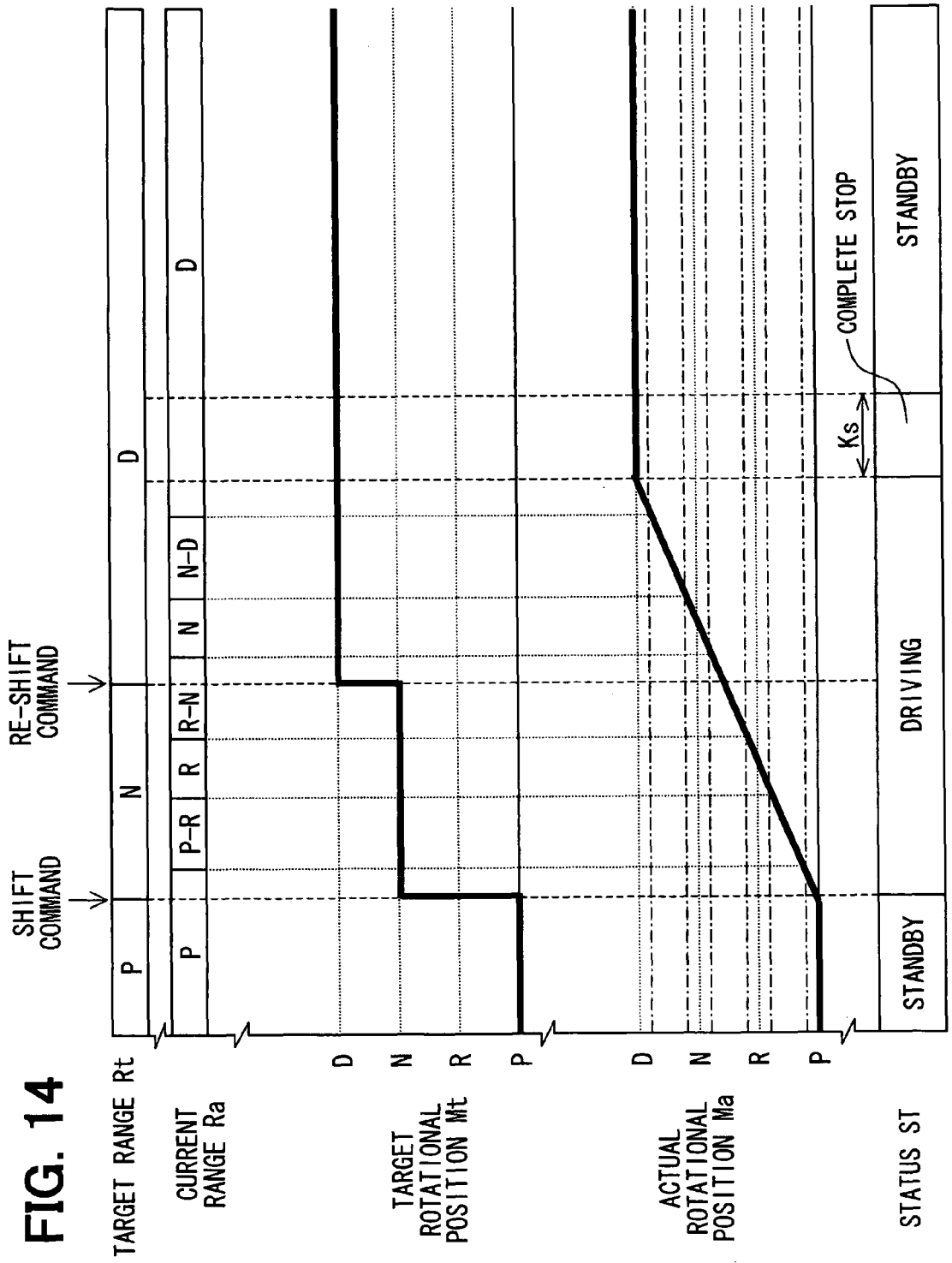
FIG. 14 is a diagram illustrating a first exemplary re-commanded operation of the shift-by-wire system in accordance with a first embodiment.

A First Exemplary Operation, Shown in FIG. 14, is Concerned with a Case where the target rotational position Mt necessary to comply with a re-shift command exists in the actual rotational direction Da with respect to the actual rotational position Ma of the electric motor 24 when the re-shift command is input. In the first exemplary operation as shown in FIG. 14, switching from the P range to the N range can be requested with the first shift command, and switching from the N range to the D range can be requested with the re-shift command.

First, a shift command is inputted with the status ST set to Standby. After the target range Rt is set to the N range and the target rotational position Mt is set to an N-range realizable position, the status ST is changed to Driving, and the electric motor 24 is rotated toward the target rotational position Mt.

Thereafter, if a re-shift command is inputted prior to realization of the N range, a new target rotational position Mt to be set to a D-range realizable position to comply with the command, which corresponds to the tentative target rotational position Mtt in the aforesaid control flow, exists in the actual rotational direction Da attained at the time point of input of the command. In the present embodiment, the rotation in the actual rotational direction Da is continued toward the new target rotational position Mt to comply with the re-shift command.

As mentioned above, when the actual rotational position Ma reaches the new target rotational position Mt, the status ST is changed to Complete Stop. The electric motor 24 is therefore stopped. After the time Ks elapses, when the status ST is changed to Standby, range switching control is terminated.

In the case where the target rotational position Mt to comply with a re-shift command exists in the actual rotational direction Da, the rotation in the actual rotational direction Da is continued as it is. Thus, responsiveness can be improved while suppressing a sense of discrepancy or discomposure from being given to a user.

Figure 15:
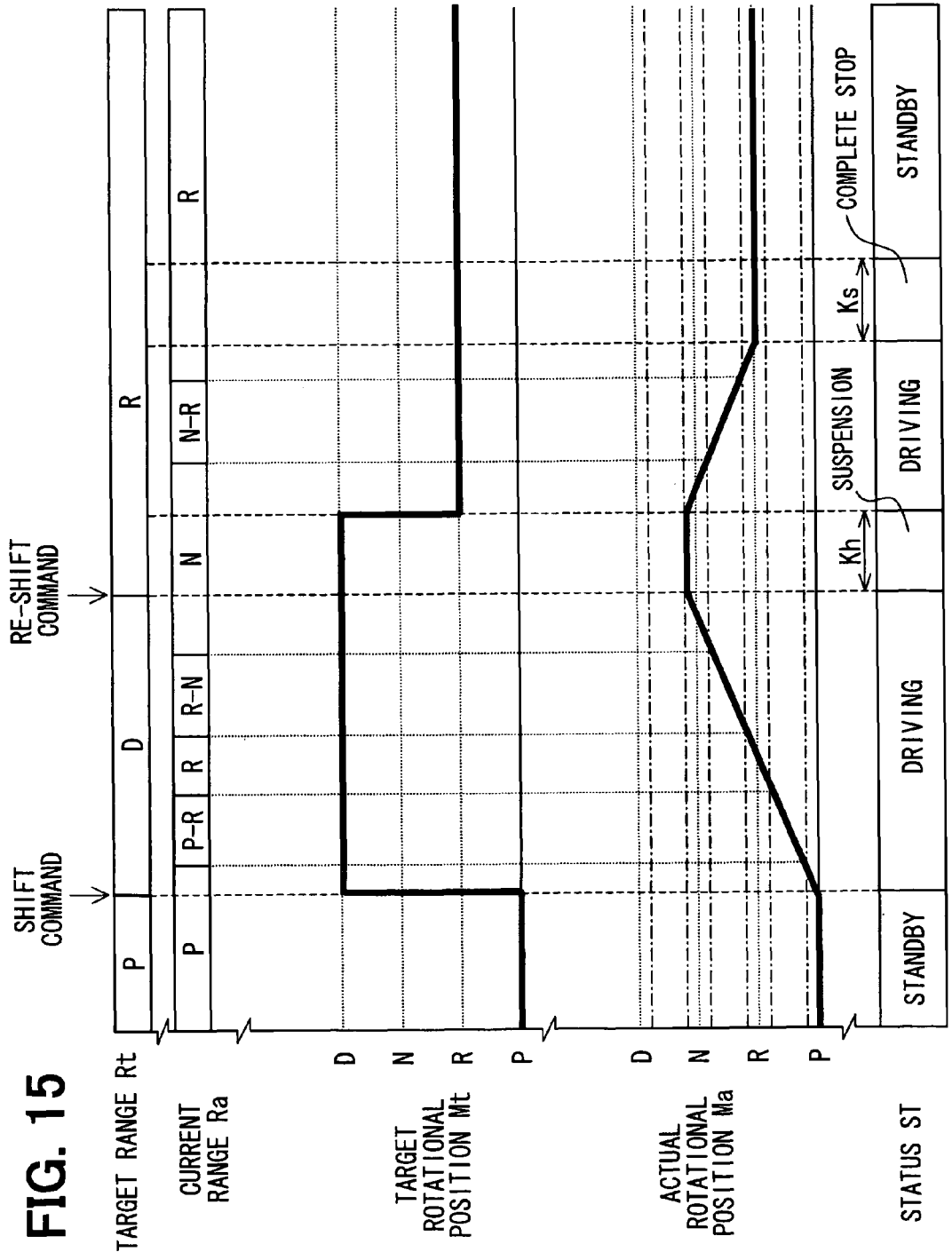
FIG. 15 is a diagram illustrating a second exemplary re-commanded operation of the shift-by-wire system in accordance with a first embodiment.

A second exemplary operation shown, for example, in FIG. 15, is concerned with a case where the target rotational position Mt required to comply with a re-shift command exists in a direction Dr opposite to the actual rotational direction attained at the time point of input of the re-shift command with respect to the actual rotational position Ma lying in the neutral region An at the time point of input of the re-shift command. In the exemplary second operation in FIG. 15, switching from the P range to the D range can be requested with the first shift command, and switching from the D range to the R range can be requested with a re-shift command at an N-range realizable position belonging to the neutral region An.

First, a shift command is inputted with the status ST set to Standby. After the target range Rt is set to the D range and the target rotational position Mt is set to a D-range realizable position, the status ST is changed to Driving, and the electric motor 24 is rotated toward the target rotational position Mt.

Thereafter, when a re-shift command is inputted prior to realization of the D range at the actual rotational position Ma, which realizes the N range, a new target rotational position Mt is set to an R-range realizable position required to comply with the command. The new target rotational position Mt corresponds to the tentative target rotational position Mtt and exists in the direction Dr opposite to the actual rotational direction Da attained at the time point of input of the command. In the present embodiment, the status ST is changed to Suspension, and the rotation of the electric motor 24 is controlled to be null at the actual rotational position Ma that realizes the N range. After the designated time Kh elapses, if the status ST is changed to Driving, the electric motor 24 is rotated toward the new target rotational position Mt to comply with the re-shift command.

As mentioned above, when the actual rotational position Ma reaches the new target rotational position Mt, the status ST is changed to Complete Stop. The electric motor 24 is therefore stopped. After the time Ks elapses, if the status ST is changed to Standby, range switching control is terminated.

If the target rotational position Mt, required to comply with a re-shift command, exists in the direction Dr opposite to the actual rotational direction Da, the electric motor 24 is immediately stopped in the neutral region An before being reversed to the direction Dr. Consequently, an event that a sense of discrepancy or discomposure is given to a user can be suppressed.

Figure 16:
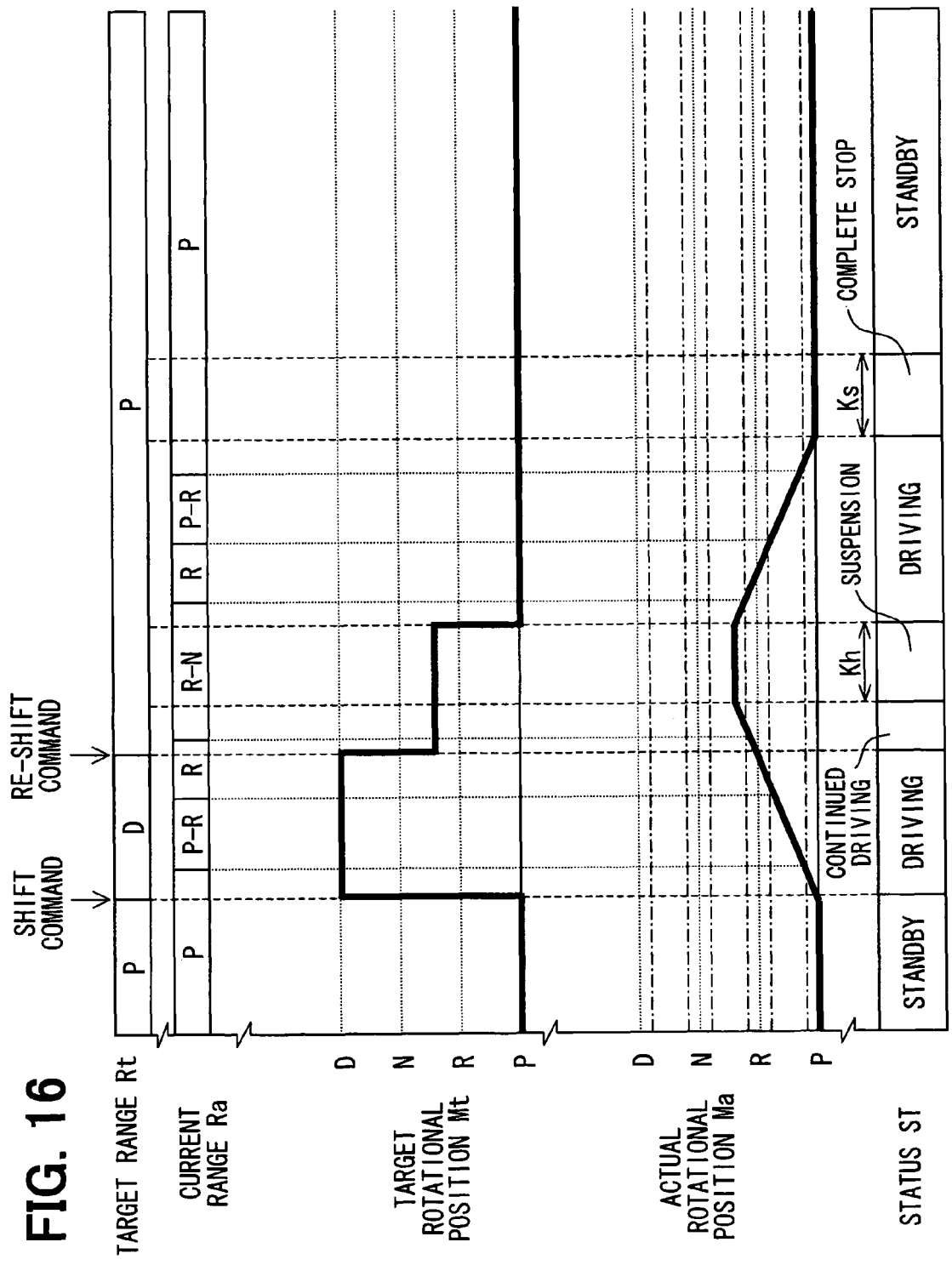
FIG. 16 is a diagram illustrating a third exemplary re-commanded operation of the shift-by-wire system in accordance with a first embodiment.

In a third exemplary operation, as shown in FIG. 16, the target rotational position Mt required to comply with a re-shift command exists in the direction Dr opposite to the actual rotational direction Da attained at the time point of input of the re-shift command with respect to the actual rotational position Ma lying in the non-neural region Ad at the time point of input of the re-shift command. Further, at least one neutral region An exists in the actual rotational direction Da. In the example of FIG. 16, switching from the P range to the D range can be requested with the first shift command, and switching from the D range to the P range can be requested with a re-shift command inputted at an R-range realizable position belonging to the non-neutral region Ad.

First, a shift command is inputted with the status ST set to Standby. After the target range Rt is set to the D range and the target rotational position Mt is set to a D-range realizable position, the status ST is changed to Driving. The electric motor 24 is therefore rotated toward the target rotational position Mt.

Thereafter, if a re-shift command is inputted at the actual rotational position Ma, which realizes the R range, prior to realization of the D range, a new target rotational position Mt set to a P-range realizable position to comply with the command and corresponding to the tentative target rotational position Mtt, exists in the direction Dr opposite to the actual rotational direction Da attained at the time point of input of the command. Moreover, at this time, two intermediate regions R-N and N-D belonging to the neutral region An exist in the actual rotational direction Da. Therefore, in the present embodiment, the status ST is changed to Continued Driving. The rotation in the actual rotational direction Da is therefore continued toward the intermediate region R-N closest to the current actual rotational position Ma.

When the actual rotational position Ma reaches the intermediate region R-N, the status ST is changed to Suspension. The rotation of the electric motor 24 is therefore controlled to be null in the intermediate region R-N. After the designated time Kh elapses, if the status ST is changed to Driving, the electric motor 24 is rotated toward the new target rotational position Mt to comply with the re-shift command.

As mentioned above, when the actual rotational position Ma reaches the new target rotational position Mt, the status ST is changed to Complete Stop. The electric motor 24 is therefore stopped. After the time Ks elapses, when the status ST is changed to Standby, range switching control is terminated.

In the case where the target rotational position Mt to comply with a re-shift command exists in the direction Dr opposite to the actual rotational direction Da, the electric motor 24 is rotated to the neutral region An before being reversed in the direction Dr, and then stopped. Consequently, an event that a sense of discrepancy or discomposure is given to a user can be suppressed. Moreover, in the present embodiment, the electric motor 24 is rotated to the neutral region An closest to the actual rotational position Ma, and stopped for a time duration required for reversion. Consequently, the time during which the automatic transmission 42 enters the neutral state can be shortened, and a sense of discrepancy can be alleviated.

Figure 17:
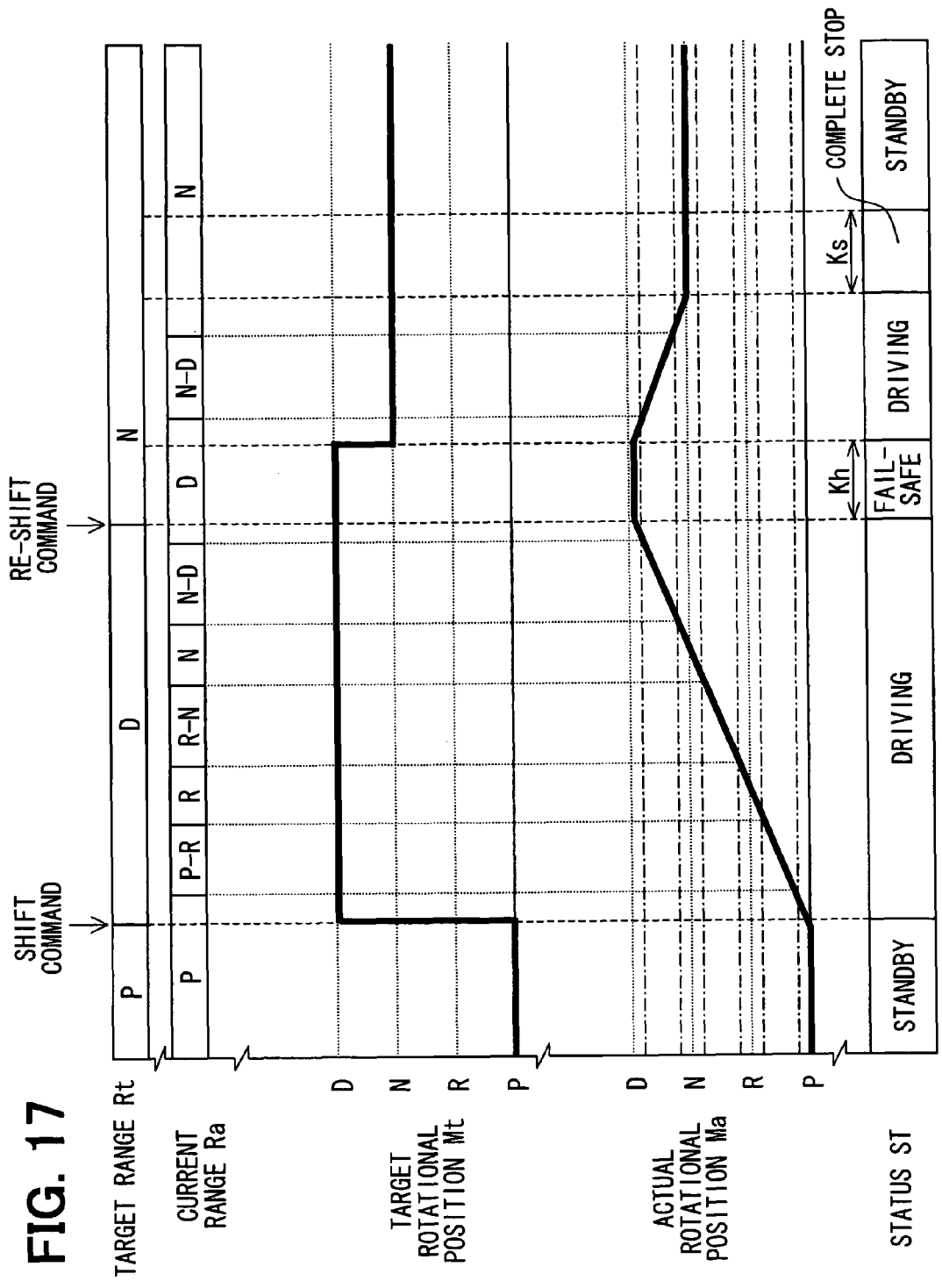
FIG. 17 is a diagram illustrating a fourth exemplary re-commanded operation of the shift-by-wire system in accordance with a first embodiment.

In a fourth exemplary operation, as shown in FIG. 17, the target rotational position Mt required to comply with a re-shift command exists in the direction Dr opposite to the actual rotational direction Da attained at the time point of input of the re-shift command with respect to the actual rotational position Ma lying in the non-neutral region Ad at the time point of input of the re-shift command. The neutral region An does not exist in the actual rotational direction Da. In the present example, switching from the P range to the D range can be requested with the first shift command, and switching from the D range to the N range can be requested with the re-shift command inputted at a D-range realizable position belonging to the non-neutral region Ad.

First, a shift command is inputted with the status ST set to Standby. After the target range Rt is set to the D range and the target rotational position Mt is set to a D-range realizable position, the status ST is changed to Driving. The electric motor 24 is therefore rotated toward the target rotational position Mt.

Thereafter, if a re-shift command is inputted at the actual rotational position that realizes the D range, before the status ST is changed to Standby, a new target rotational position Mt is set to an N-range realizable position to comply with the command and corresponds to the tentative target rotational position Mtt. The new target rotational position Mt exists in the direction Dr opposite to the actual rotational direction Da attained at the time point of input of the command. Moreover, no neutral regions An exist in the actual rotational direction Da. In the present embodiment, the status ST is changed to Fail-safe, while an engine torque is decreased to effect fail-safe control and a warning of the decrease is provided, the rotation of the electric motor 24 is controlled to be null at the actual rotational position Ma realizing the D range. After the designated time Kh elapses, if the status ST is changed to Driving, the electric motor 24 is rotated toward the new target rotational position Mt to comply with the re-shift command.

As mentioned above, when the actual rotational position Ma reaches the new target rotational position Mt, the status ST is changed to Complete Stop. The electric motor 24 is therefore stopped. After the time Ks elapses, if the status ST is changed to Standby, range switching control is terminated.

Where the target rotational position Mt required to comply with a re-shift command exists in the direction Dr opposite to the actual rotational direction Da, while fail-safe control intended to ensure safety is implemented, the electric motor 24 is stopped in the non-neutral region Ad before being reversed in the direction Dr. Thus, a user's sense of discomposure can be alleviated.

Figure 18:
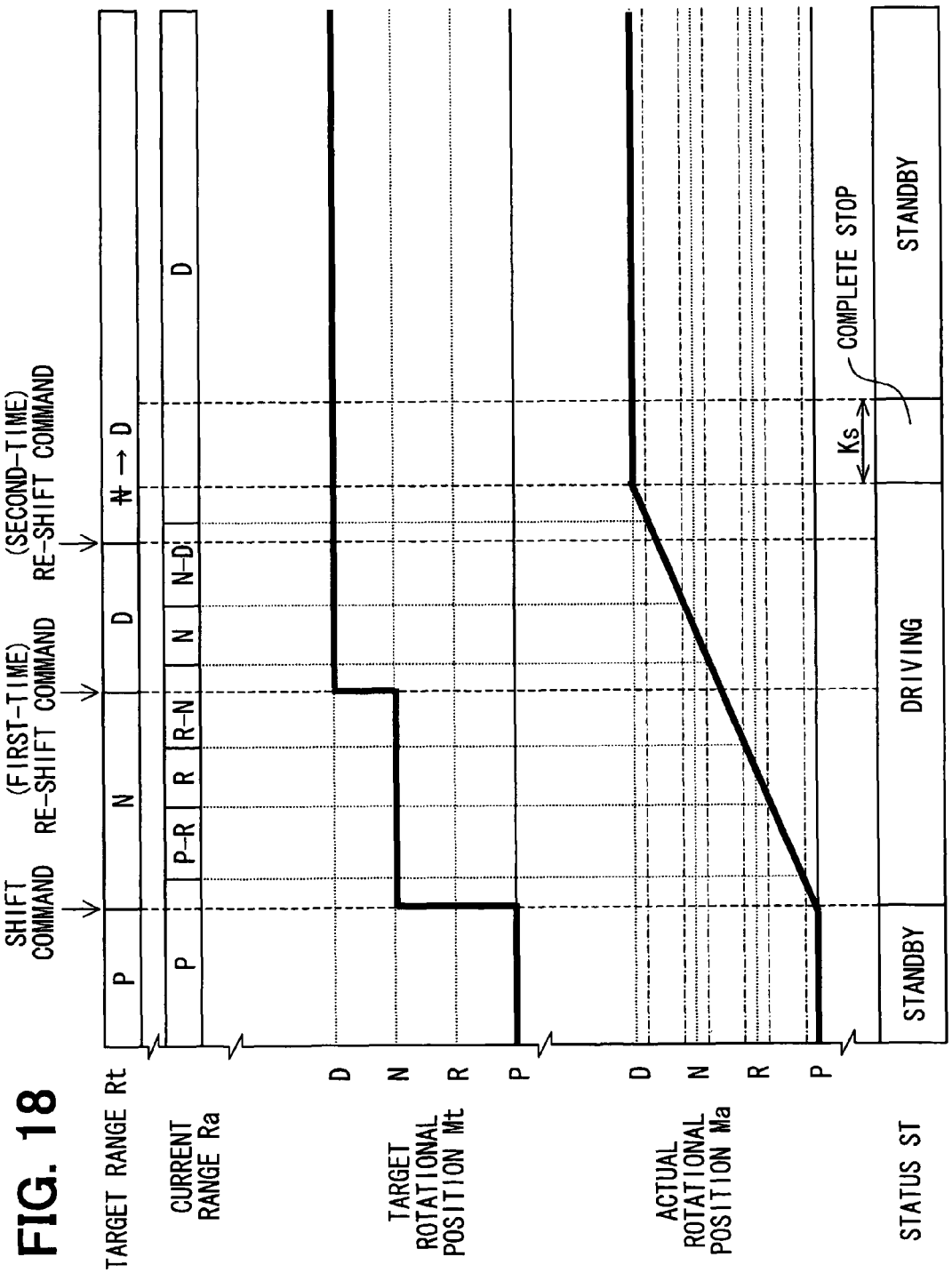
FIG. 18 is a diagram illustrating a fifth exemplary re-commanded operation of the shift-by-wire system in accordance with a first embodiment.

In a fifth exemplary operation, shown in FIG. 18, while the electric motor 24 is rotated toward the target rotational position Mt to comply with a re-shift command, the re-shift command is inputted for a second time, which exceeds a limit that is placed on the number of times for shifting. Switching from the D range to the N range can be requested with the second-time re-shift command. When the electric motor 24 has been rotated to comply with a first-time re-shift command, and a second-time re-shift command is inputted, the second-time re-shift command is rejected and a user is warned of the rejection. Consequently, while a sense of discrepancy derived from the rejection of the re-shift command is alleviated, a D-range realizable position to comply with the first-time re-shift command is regarded as the target rotational position Mt so that the actual rotational position Ma will reach the target rotational position Mt. After the actual rotational position Ma reaches the target rotational position Mt, the status ST is changed to Complete Stop. After the electric motor 24 is stopped, if the status ST is changed to Standby, range switching control is terminated.

Since an inputted re-shift command that exceeds a limit for the number of times a re-shift command can be entered is rejected, the likelihood that the by-wire ECU 20 is overheated and eventually damaged because of the input of the repeating of the shift command due to mischief or the like, can be reduced.

As described, according to the first embodiment, responsiveness can be improved by handling a re-shift command during range switching control. Moreover, safety can be ensured by suppressing shifting related events that give a sense of discrepancy or discomposure to a user.

Incidentally, in accordance with a first embodiment, the warning device 19, the by-wire ECU 20, the transmission ECU 40 and hydraulic circuit 44, the engine ECU 60 are all variously set forth in accordance with various means recited in the claims.

(Second Embodiment)

Figure 19:
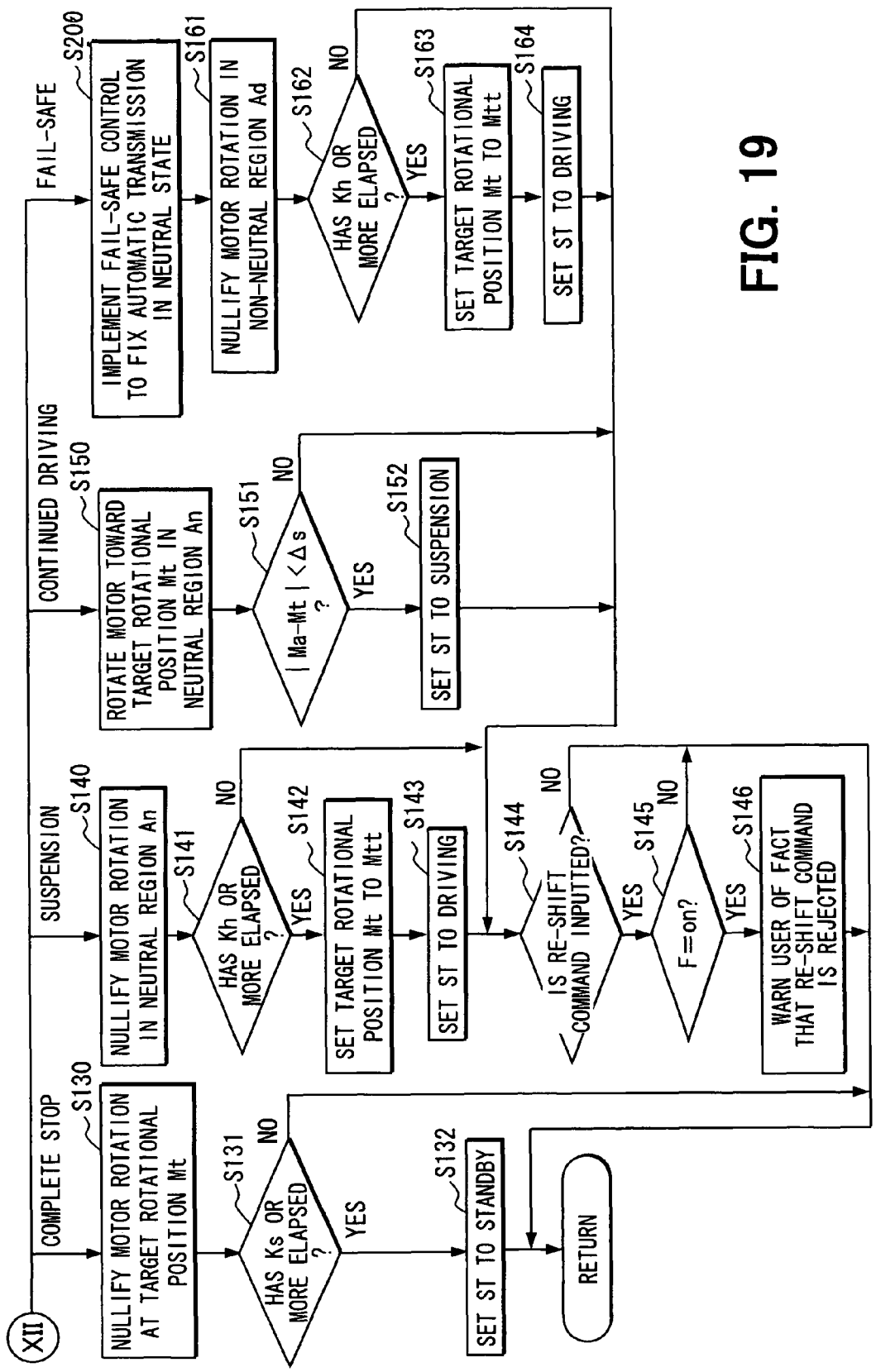
FIG. 19 is a flowchart illustrating an exemplary flow of a range control in accordance with a second embodiment.

As described in FIG. 19, a second embodiment is described herein that is a variant of the first embodiment. In the second embodiment, at S200 of fail-safe processing that proceeds when the status ST is recognized as Fail-safe, the automatic transmission 42 is fixed in the neutral state based on the fail-safe control and independent of the fail-safe control to be implemented in the electric motor 24 lying in the non-neutral region Ad.

To be more specific, a control signal causing a predetermined electromagnetic valve 48 to release the associated frictional element so as to forcibly realize the N range is fed to the transmission ECU 40. Consequently, the automatic transmission 42 is fixed in the neutral state and vehicle safety is ensured. Therefore, even if the electric motor 24 is stopped in the non-neutral region Ad at S161 succeeding S200, a sense of discomposure to be given to a user can be alleviated.

(Other Embodiment)

Multiple embodiments have been described herein. However, the present invention should not be interpreted as being restricted to the embodiments, but can be applied to various embodiments without a departure from the invention.

Specifically, the electric motor 24 may include any type of motor other than the switched reluctance motor. The time Kh during which the rotation of the electric motor 24 is controlled to be null by performing suspension processing and fail-safe processing should be appropriately designated based on the type of electric motor 24 employed. For example, the time may be designated so that the rotation of the electric motor 24 can be instantaneously nullified and then reversed.

The by-wire control circuit unit may be formed with one electric circuit or multiple electric circuits. The electric circuit forming the by-wire control circuit unit can include the ECU 40 or 60 that forms a portion of the electric circuit of the other system 4 or 6 and thus may be used in common.

The actual rotational position Ma may be indirectly calculated based on the result of detection by an inhibitor switch, a linear sensor, or any other range sensor that detects an actual range Ra on the basis of, for example, the input-side rotational position or output-side driving position of the conversion mechanism 22 or the spool moving position of the manual valve 46, and used for control.

Figure 20:
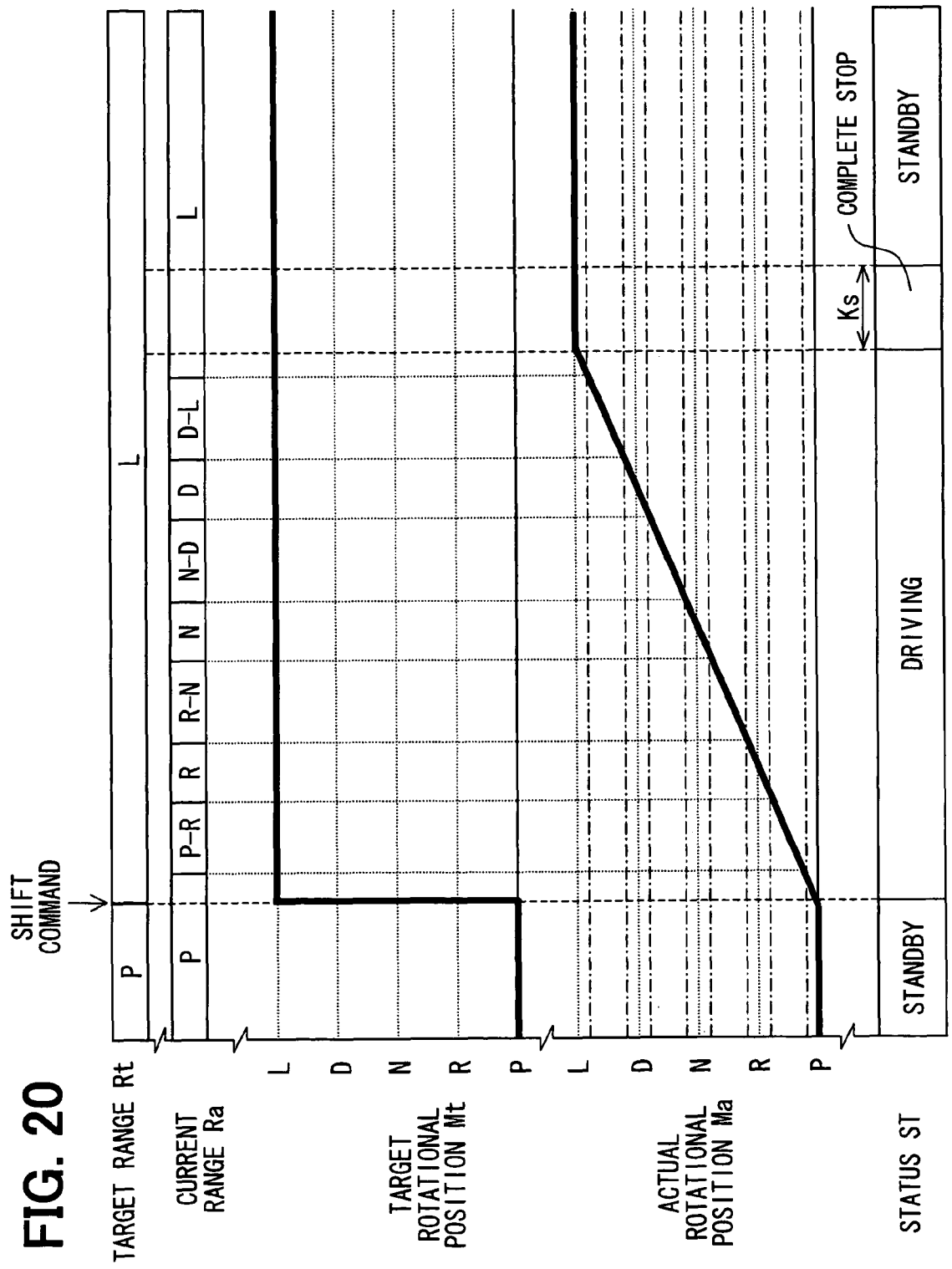
FIG. 20 is a diagram illustrating an exemplary variant of the normal operation shown in FIG. 13.
Figure 21:
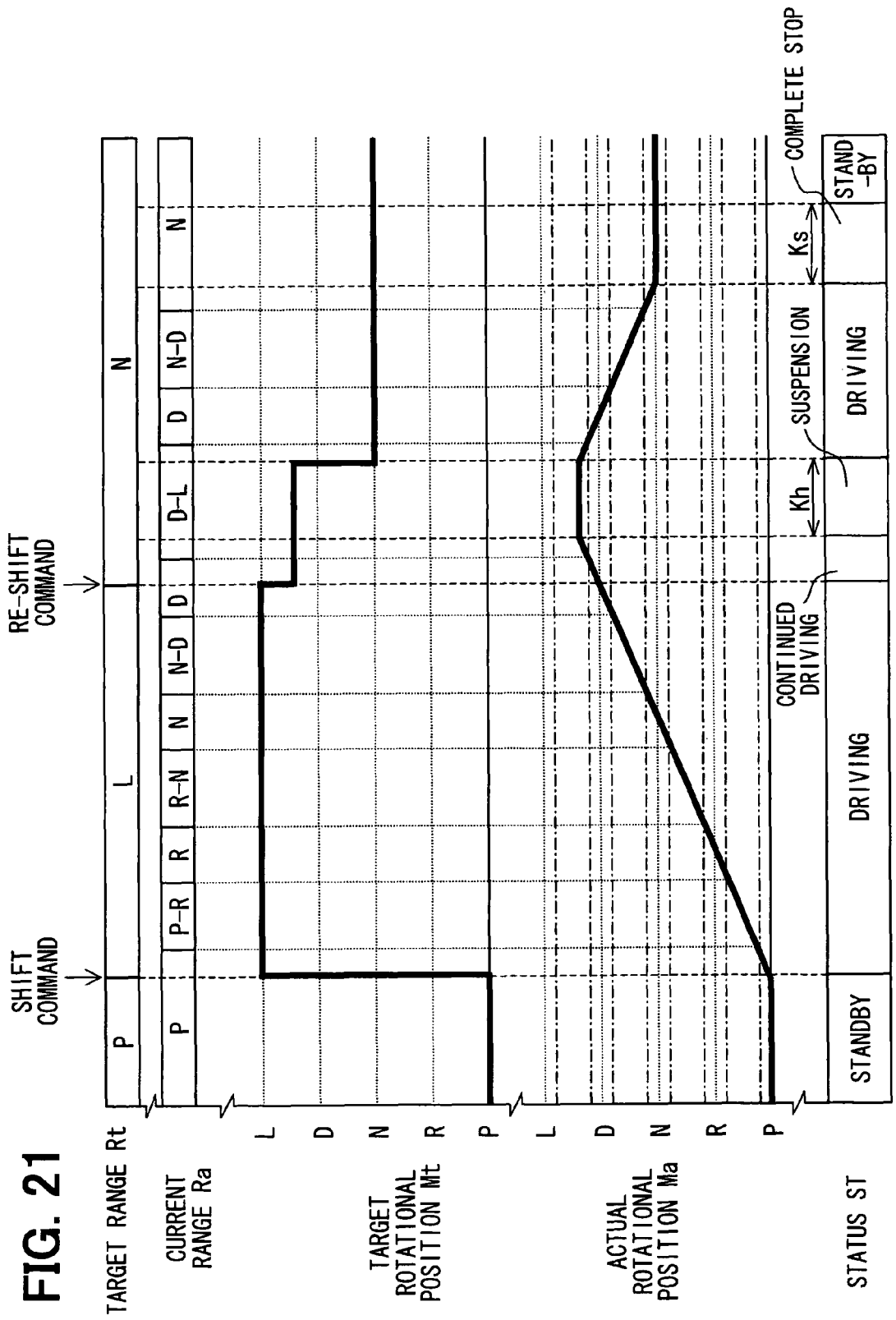
FIG. 21 is a diagram illustrating an exemplary variant of the re-commanded operation shown in FIG. 16.

As the automatic transmission 42, aside from an automatic transmission supporting four ranges of the P, R, N, and D ranges, an automatic transmission supporting, in addition to the P, R, N, and D ranges, a low (L) range that is a running range realizing the non-neutral state may be adopted like, for example, a variant shown in FIG. 20. Moreover, in the case where the L range is added, even when a re-shift command requesting switching from the L range to the N range is inputted at the actual rotational position Ma of a D-range realizable position, if an intermediate region D-L nearest to the current position Ma is, like, for example, a variant shown in FIG. 21, considered to belong to the neutral region An, the electric motor 24 is rotated to the region D-L and then suspended.

At S123 of driving processing, the target rotational position Mt may be set in the neutral region An nearest to the tentative target rotational position Mtt to comply with a re-shift command but not be set to the current actual rotational position Ms in the current actual rotational direction Da.

As for fail-safe control, the decrease in an engine torque described in relation to the first embodiment and fixing in the neutral state described in relation to the second embodiment may be implemented in combination, or one of them may be selectively implemented under a specific condition. Moreover, during fail-safe control, a warning may not be given to a user.

Further, it will be appreciated that the limit on the number of times that a re-shift command can be input can be set to any appropriate value other than 1. Moreover, when the presently inputted re-shift command, which exceeds the limit on the number of times that a re-shift command can be input, is rejected, warning may not necessarily be given to a user.

What is claimed is:

1. A shift-by-wire system comprising:
an electric motor that generates a rotational output to be used to switch a range of an automatic transmission in a vehicle that includes in succession at least a parking range, a reverse range, a neutral range and a drive range; and
a by-wire control circuit that is configured to electrically control rotation of the electric motor to a target rotational position to comply with an inputted shift command,
wherein the actual rotational position of the electric motor lies in a neutral region when a rotational region of the electric motor brings the automatic transmission to a neutral state,
wherein the actual rotational position of the electric motor lies in a non-neutral region when a rotational region of the electric motor brings the automatic transmission to a non-neutral state,
wherein said control circuit is configured such that:
when a re-shift command is inputted during a rotation control operation that switches the range, the rotation control operation applied to the electric motor so as to generate the rotational output to comply with the inputted shift command according to the actual rotational position of the electric motor attained when the re-shift command is inputted, the by-wire control circuit modifies the rotation control operation until the rotational position of the electric motor reaches a new target rotational position to comply with the re-shift command; and
when the new target rotational position lies in a direction opposite to the actual rotational direction of the electric motor at the time of the input of the re-shift command with respect to the actual rotational position, the by-wire control circuit selects one of first and second operations according to a relationship between (a) the actual rotational position and (b) the neutral position,
wherein the first and second operations include:
a first operation which includes a first sequence of operations selected as a function of then existing actual rotational position of the electric motor; and
a second operation, different than said first operation, also selected as a function of then existing actual rotational position of the electric motor, and including a second sequence of operations which differs in at least one operation from said first sequence of operations; and
wherein:
(i) when the new target rotational position lies in a direction opposite to the actual rotational direction of the electric motor at the time of the input of the re-shift command with respect to the actual rotational position;

(ii) when the actual rotational position lies in a non-neutral region that includes a rotational region of the electric motor that brings the automatic transmission to a non-neutral state and the neutral region lies in the actual rotational direction with respect to the actual rotational position; and (iii) after the by-wire control circuit unit continues the rotation in the actual rotational direction of the electric motor so that the rotational position of the electric motor will reach the neutral region in the actual rotational direction, and controls the rotation of the electric motor so that the rotation of the electric motor will be null in the neutral region, the by-wire control circuit unit rotates the electric motor in the opposite direction so that the rotational position of the electric motor will reach the new target rotational position.

2. The shift-by-wire system according to claim 1, wherein:
(a) when the new target rotational position lies in a direction opposite to the actual rotational direction of the electric motor at the time of the input of the re-shift command with respect to the actual rotational position;
(b) when the actual rotational position lies in a neutral region that includes a rotational region of the electric motor that brings the automatic transmission to a neutral state; and
(c) after the by-wire control circuit unit controls the rotation of the electric motor so that the rotation of the electric motor will be null in the neutral region to which the actual rotational position belongs,
then the by-wire control circuit is configured to rotate the electric motor in the opposite direction so that the rotational position of the electric motor will reach the new target rotational position.

3. The shift-by-wire system according to claim 2, wherein:
(i) when the new target rotational position lies in a direction opposite to the actual rotational direction of the electric motor attained at the time point of input of the re-shift command with respect to the actual rotational position;
(ii) when the actual rotational position lies in a non-neutral region that includes a rotational region of the electric motor that brings the automatic transmission to a non-neutral state; and the neutral region does not lie in the actual rotational direction with respect to the actual rotational position; and
(iii) after the by-wire control circuit unit controls the rotation of the electric motor so that the rotation of the electric motor will be null in the non-neutral region, to which the actual rotational position belongs, while implementing fail-safe control for ensuring vehicle safety,
then the by-wire control circuit is configured to rotate the electric motor in the opposite direction so that the rotational position of the electric motor will reach the new target rotational position.

4. The shift-by-wire system according to claim 3, further comprising an engine control circuit configured for controlling an engine of the vehicle, wherein a fail-safe control mode includes decreasing an output torque of the engine by the engine control means.

5. The shift-by-wire system according to claim 3, further comprising a transmission control circuit configured for controlling the automatic transmission independently of the shift-by-wire system, wherein a fail-safe control mode includes fixing the automatic transmission in the neutral state.

6. The shift-by-wire system according to claim 3, further comprising a warning unit that gives warning during fail-safe control.

7. The shift-by-wire system according to claim 2, wherein the neutral region includes a rotational region of the electric motor over at least one of a neutral range and a parking range of the automatic transmission.

8. The shift-by-wire system according to claim 2, wherein the neutral region is set among a plurality of rotational regions of the electric motor over a plurality of ranges of the automatic transmission.

9. The shift-by-wire system according to claim 1, wherein the non-neutral region includes a rotational region of the electric motor over a running range of the automatic transmission.

10. The shift-by-wire system according to claim 1, wherein, when the new target rotational position lies in the actual rotational direction of the electric motor attained at the time point of input of the re-shift command with respect to the actual rotational position, the by-wire control circuit is configured to continue rotation in the actual rotational direction of the electric motor so that the rotational position of the electric motor will reach the new target rotational position.

11. The shift-by-wire system according to claim 1, further comprising a limit value configured to limit the number of times a given re-shift command is inputted, wherein when a next re-shift command exceeds the limit value, the by-wire control circuit is configured to reject input of the next re-shift command.

12. The shift-by-wire system according to claim 1, wherein the first and second operations include:
a first operation which is selected in such a manner that the by-wire control circuit initially continues rotation in the actual rotational direction of the electric motor, then controls rotation of the electric motor so that the rotation of the electric motor will be null, and then rotates the electric motor in the opposite direction so that the rotational position of the electric motor will reach the new target rotational position; and
a second operation which is selected in such a manner that the by-wire control circuit initially controls rotation of the electric motor so that rotation of the electric motor will be null, and then rotates the electric motor in the opposite direction so that the rotational position of the electric motor will reach the new target rotational position.

13. The shift-by-wire system according to claim 1, wherein:
when the new target rotational position lies in a direction opposite to the actual rotational direction of the electric motor at the time of the input of the re-shift command with respect to the actual rotational position, the by-wire control circuit selects one of first and second operations according to the actual rotational position, the operations including:
a first operation where the by-wire control circuit continues rotation in actual rotational direction of the electric motor, controls rotation of the electric motor so that rotation of the electric motor will be null, and rotates the electric motor in an opposite direction so that the rotational position of the electric motor will reach the new target rotational position; and
a second operation where the by-wire control circuit controls rotation of the electric motor so that rotation of the electric motor will be null, and rotates the electric motor in an opposite direction so that the rotational position of the electric motor will reach the new target rotational position, and the range of the automatic transmission includes at least a parking range, a reverse range, a neutral range and a drive range.

14. A shift-by-wire system comprising:

an electric motor that generates a rotational output to be used to switch a range of an automatic transmission in a vehicle; and a by-wire control circuit that is configured to electrically control the rotation of the electric motor to a target rotational position to comply with an inputted shift command;

wherein:

when a re-shift command is inputted during a rotation control operation that switches the range, the rotation control operation applied to the electric motor so as to generate the rotational output to comply with the inputted shift command according to the actual rotational position of the electric motor attained when the re-shift command is inputted, the by-wire control circuit modifies the rotation control operation until the rotational position of the electric motor reaches a new target rotational position to comply with the re-shift command;

when the new target rotational position lies in a direction opposite to the actual rotational direction of the electric motor at the time of the input of the re-shift command with respect to the actual rotational position;

when the actual rotational position lies in a non-neutral region that includes a rotational region of the electric motor that brings the automatic transmission to a non-neutral state and a neutral region lies in the actual rotational direction with respect to the actual rotational position;

after the by-wire control circuit unit continues the rotation in the actual rotational direction of the electric motor so that the rotational position of the electric motor will reach the neutral region in the actual rotational direction, and controls the rotation of the electric motor so that the rotation of the electric motor will be null in the neutral region;

the by-wire control circuit unit rotates the electric motor in the opposite direction so that the rotational position of the electric motor will reach the new target rotational position; and when at least one neutral region lies in the actual rotational direction with respect to the actual rotational position, the by-wire control circuit is configured to cause the rotational position of the electric motor to reach the neutral region nearest the actual rotational position in the actual rotational direction.

15. A shift-by-wire system comprising:

an electric motor that generates a rotational output to be used to switch a range of an automatic transmission in a vehicle; and a by-wire control circuit that is configured to electrically control the rotation of the electric motor to a target rotational position to comply with an inputted shift command;

wherein:

when a re-shift command is inputted during a rotation control operation that switches the range, the rotation control operation applied to the electric motor so as to generate the rotational output to comply with the inputted shift command according to the actual rotational position of the electric motor attained when the re-shift command is inputted, the by-wire control unit modifies the rotation control operation until the rotational position of the electric motor reaches a new target rotational position to comply with the re-shift command;

said system further comprising:

a limit value to limit the number of times a given re-shift command is inputted, wherein when a next one of the given re-shift command that has already been inputted exceeds the limit value, the by-wire control circuit unit rejects input of the next one of the given re-shift command; and a warning unit that gives warning during rejection of the re-shift command; and wherein:

(i) when the new target rotational position lies in a direction opposite to the actual rotational direction of the electric motor at the time of the input of the re-shift command with respect to the actual rotational position;

(ii) when the actual rotational position lies in a non-neutral region that includes a rotational region of the electric motor that brings the automatic transmission to a non-neutral state and the neutral region lies in the actual rotational direction with respect to the actual rotational position; and (iii) after the by-wire control circuit unit continues the rotation in the actual rotational direction of the electric motor so that the rotational position of the electric motor will reach the neutral region in the actual rotational direction, and controls the rotation of the electric motor so that the rotation of the electric motor will be null in the neutral region, the by-wire control circuit unit rotates the electric motor in the opposite direction so that the rotational position of the electric motor will reach the new target rotational position.

16. A method for reducing a sense discrepancy between an actual shift operation and a desired shift operation in a shift-by-wire system for a vehicle having an automatic transmission, the shift-by-wire system being configured so as to be capable of receiving a shift command for shifting a range of the automatic transmission by rotation of an electric motor in an actual rotational direction from an actual rotational position to a target rotational position associated with the shift command during a rotation control operation between successive shift ranges that include at least a parking range, a reverse range, a neutral range and a drive range, the method comprising:

receiving a re-shift command input associated with a new target rotational position; and modifying the rotation control operation until the actual rotational position of the electric motor reaches the new target rotational position to comply with the re-shift command;

wherein the actual rotational position of the electric motor lies in a neutral region when a rotational region of the electric motor brings the automatic transmission to a neutral state, wherein the actual rotational position of the electric motor lies in a non-neutral region when a rotational region of the electric motor brings the automatic transmission to a non-neutral state, wherein when the new target rotational position lies in a direction opposite to the actual rotational direction of the electric motor at the time of the input of the re-shift command with respect to the actual rotational position, the shift-by-wire system selects one of first and second operations according to a relationship between (a) the actual rotational position and (b) the neutral position, wherein the first and second operations include:

a first operation which includes a first sequence of operations selected as a function of then existing actual rotational position of the electric motor; and a second operation, different than said first operation, also selected as a function of then existing actual rotational position of the electric motor, and including a second sequence of operations which differs in at least one operation from said first sequence of operations; and wherein:

(i) when the new target rotational position lies in a direction opposite to the actual rotational direction of the electric motor at the time of the input of the re-shift command with respect to the actual rotational position;

(ii) when the actual rotational position lies in a non-neutral region that includes a rotational region of the electric motor that brings the automatic transmission to a non-neutral state and the neutral region lies in the actual rotational direction with respect to the actual rotational position; and (iii) after the by-wire control circuit unit continues the rotation in the actual rotational direction of the electric motor so that the rotational position of the electric motor will reach the neutral region in the actual rotational direction, and controls the rotation of the electric motor so that the rotation of the electric motor will be null in the neutral region, the by-wire control circuit unit rotates the electric motor in the opposite direction so that the rotational position of the electric motor will reach the new target rotational position.

17. The method according to claim 16, wherein when the new target rotational position lies in a direction opposite to the actual rotational direction at the time of the input of the re-shift command with respect to the actual rotational position and when the actual rotational position lies in a neutral region associated with a neutral state of the automatic transmission, the method further comprises:

stopping the rotation of the electric motor in the neutral region; and reversing a direction of the rotation of the electric motor such that the actual rotational position of the electric motor will reach the new target rotational position.

18. The method according to claim 16, wherein when the new target rotational position lies in a direction opposite to the actual rotational direction of the electric motor at the time of the input of the re-shift command with respect to the actual rotational position and when the actual rotational position lies in a non-neutral region associated with a non-neutral state of the automatic transmission and a neutral region associated with a neutral state of the automatic transmission lies in the actual rotational direction with respect to the actual rotational position, the method further comprises:

continuing the rotation of the electric motor to reach the neutral region in the actual rotational direction;

stopping the rotation of the electric motor in the neutral region, reversing a direction of the rotation of the electric motor such that the rotational position of the electric motor will reach the new target rotational position.

19. The method according to claim 18, wherein when at least one neutral region lies in the actual rotational direction with respect to the actual rotational position, the method further comprises:

causing the rotation of the electric motor to reach the neutral region nearest the actual rotational position in the actual rotational direction.

20. The shift-by-wire system according to claim 16, wherein when the new target rotational position lies in a direction opposite to the actual rotational direction of the electric motor attained at the time point of input of the re-shift command with respect to the actual rotational position and when the actual rotational position lies in a non-neutral region associated with a non-neutral state of the automatic transmission and when and a neutral region associated with a neutral state of the automatic transmission does not lie in the actual rotational direction with respect to the actual rotational position, the method further comprises:

causing the rotation of the electric motor to stop in the non-neutral region where the actual rotational position lies, while implementing fail-safe control for ensuring vehicle safety, reversing a direction of the rotation of the electric motor so that the rotational position of the electric motor will reach the new target rotational position.

21. The method according to claim 16, further comprising limiting the number of times a given re-shift command is inputted, wherein when a next one of the given re-shift command that has already been inputted exceeds a predetermined limit value, input of the next one of the given re-shift command is rejected.

22. The method according to claim 16, wherein the first and second operations include:

a first operation which is selected in such a manner that the by-wire control circuit initially continues rotation in the actual rotational direction of the electric motor, then controls rotation of the electric motor so that the rotation of the electric motor will be null, and then rotates the electric motor in the opposite direction so that the rotational position of the electric motor will reach the new target rotational position; and a second operation which is selected in such a manner that the by-wire control circuit initially controls rotation of the electric motor so that rotation of the electric motor will be null, and then rotates the electric motor in the opposite direction so that the rotational position of the electric motor will reach the new target rotational position.

* * * * *